United States Patent
Schechter et al.

(10) Patent No.: US 11,264,623 B2
(45) Date of Patent: Mar. 1, 2022

(54) PALLADIUM-TIN SHELL ELECTROCATALYSTS, THE PREPARATION THEREOF, AND USING THE SAME FOR FUEL CELLS

(71) Applicant: ARIEL SCIENTIFIC INNOVATIONS LTD., Ariel (IL)

(72) Inventors: Alex Schechter, Givat Koah (IL); Hanan Teller, Revava (IL); Diwakar Kashyap, Ariel (IL); Antony Cyril Arulrajan, Thoothukudi (IN)

(73) Assignee: ARIEL SCIENTIFIC INNOVATIONS LTD., Ariel (IL)

( * ) Notice: Subject to any disclaimer, the term of this patent is extended or adjusted under 35 U.S.C. 154(b) by 174 days.

(21) Appl. No.: 16/641,378

(22) PCT Filed: Aug. 23, 2018

(86) PCT No.: PCT/IL2018/050933
§ 371 (c)(1),
(2) Date: Feb. 24, 2020

(87) PCT Pub. No.: WO2019/038769
PCT Pub. Date: Feb. 28, 2019

(65) Prior Publication Data
US 2020/0194804 A1 Jun. 18, 2020

Related U.S. Application Data

(60) Provisional application No. 62/549,508, filed on Aug. 24, 2017.

(51) Int. Cl.
*H01M 4/90* (2006.01)
*H01M 4/86* (2006.01)
(Continued)

(52) U.S. Cl.
CPC ....... *H01M 4/9041* (2013.01); *H01M 4/8647* (2013.01); *H01M 4/8853* (2013.01); *H01M 4/9083* (2013.01); *H01M 8/1004* (2013.01)

(58) Field of Classification Search
None
See application file for complete search history.

(56) References Cited

U.S. PATENT DOCUMENTS

| 4,066,809 A | * | 1/1978 | Alpaugh | ................. C23C 18/28 427/304 |
| 4,830,844 A | * | 5/1989 | Kolts | ................... B01J 23/6522 423/437.2 |

(Continued)

FOREIGN PATENT DOCUMENTS

| CN | 101516550 A | 8/2009 |
| CN | 101664685 A | 3/2010 |

(Continued)

OTHER PUBLICATIONS

Ding et al. Hierarchical Pd—Sn Alloy Nanosheet Dendrites: An Economical and Highly Active Catalyst for Ethanol Electrooxidation, Scientific Reports, 1181, https://doi.org/10.1038/srep01181; Feb. 4, 2013.

PCT Search Report for International Application No. PCT/IL2018/050933; mailed ; 4 pp.

(Continued)

*Primary Examiner* — Lucas J. O'Donnell
(74) *Attorney, Agent, or Firm* — The Roy Gross Law Firm, LLC; Roy Gross

(57) ABSTRACT

Compositions comprised of a tin film, coated by a shell of less than 50 nm thick made of palladium and tin in a molar ratio ranging from 1:4 to 3:1, respectively, are disclosed. Uses of the compositions as an electro-catalyst e.g., in a fuel cell, and particularly for the oxidation of various materials are also disclosed.

20 Claims, 38 Drawing Sheets

(51) Int. Cl.
*H01M 4/88* (2006.01)
*H01M 8/1004* (2016.01)

(56) References Cited

U.S. PATENT DOCUMENTS

| | | | |
|---|---|---|---|
| 5,189,006 A * | 2/1993 | Augustine | B01J 23/626 502/339 |
| 5,922,487 A | 7/1999 | Watanabe et al. | |
| 2007/0031722 A1 | 2/2007 | Adzic et al. | |
| 2007/0231674 A1 | 10/2007 | Shelnutt et al. | |
| 2007/0269705 A1 | 11/2007 | Alexandrovichserov et al. | |
| 2008/0102350 A1 | 5/2008 | Osaka et al. | |
| 2009/0297913 A1 | 12/2009 | Zhang et al. | |
| 2010/0086832 A1 | 4/2010 | Lopez et al. | |
| 2010/0216632 A1 * | 8/2010 | Adzic | H01M 4/926 502/101 |
| 2011/0086295 A1 | 4/2011 | Lopez et al. | |
| 2012/0285528 A1 | 11/2012 | Takanohashi et al. | |
| 2013/0260255 A1 * | 10/2013 | Lopatin | H01M 4/70 429/237 |
| 2015/0333338 A1 | 11/2015 | Hayden et al. | |
| 2016/0079607 A1 | 3/2016 | Kaneko et al. | |
| 2016/0214915 A1 * | 7/2016 | Weiner | B01J 23/8933 |

FOREIGN PATENT DOCUMENTS

| | | |
|---|---|---|
| CN | 102500365 A | 6/2012 |
| CN | 103657629 A | 3/2014 |
| CN | 103887529 B | 6/2014 |
| CN | 103887530 A | 6/2014 |
| EP | 2407521 | 1/2012 |
| JP | 2015056286 A | 3/2015 |
| WO | 2008080227 A1 | 7/2008 |

OTHER PUBLICATIONS

PCT Written Opinion for International Application No. PCT/IL2018/050933; mailed ; 5 pp.
PCT Preliminary Report for International Application No. PCT/IL2018/050933; dated ; 6 pp.
Santos et al., Synthesis of PT@SB/C Catalysts for Oxidation Methanol Electrochemistry in Acid Medium, Blucher Chemical Engineering Proceedings, 1.2, 13785-13792,2015.
Krichevski et al., "The Synthesis of Metallic β-Sn Nanostructures for Use as a Novel Pt Catalyst Support and Evaluation of Their Activity Toward Methanol Electrooxidation", Electrocatalysis, 2015, 6.6: 554-562.
Li et al., "Enhanced stability of Pt nanoparticle electrocatalysts for fuel cells", Nano Research 2015, 8(2):418-440.
International Search Report, International Application No. PCT/IL2018/050933, dated Dec. 6, 2018.
Olga Krichevski et al. "The Synthesis of Metallic B—Sn Nanostructures for Use as a Novel Pt Catalyst Support and Evaluation of Their Activity Toward Methanol Electrooxidation" 554-562, Aug. 27, 2015.
Bokai Liaoa et al. "Effect of citrate ions on the electrochemical migration of tin in thinelectrolyte layer containing chloride ions" (112) 393-401, Aug. 8, 2016.
Kazuhiro Fukami et al. "General Mechanism for the Synchronization of Electrochemical Oscillations and Self-Organized Dendrite Electrodeposition of Metals with Ordered 2D and 3D Microstructures" J. Phys. Chem. C, (111), 1150-1160, Dec. 15, 2006.
Jeong-Hoon Jeun et al. "Electrophoretic deposition of carbon nanoparticles on dendritic Sn foams fabricated by electrodeposition", Materials Letters, (112) 109-112, Sep. 7, 2013.
Hanan Teller et al. "Morphological study of branched Sn structure formed under selected electrochemical conditions", J Mater Sci, (51) 8471-8483, Jun. 6, 2016.

* cited by examiner

PALLADIUM-TIN SHELL ELECTROCATALYSTS, THE PREPARATION THEREOF, AND USING THE SAME FOR FUEL CELLS

CROSS-REFERENCE TO RELATED APPLICATIONS

This application is a National Phase of PCT Patent Application No. PCT/IL2018/050933 having International filing date of Aug. 23, 2018, which claims the benefit of priority from U.S. Provisional Patent Application No. 62/549,508, filed on Aug. 24, 2017. The content of the above applications are all incorporated by reference as if fully set forth herein in their entirety.

FIELD OF INVENTION

The present invention, in some embodiments thereof, relates to platinum- and palladium-tin based catalysts and uses thereof for, e.g., hydrogen oxidation.

BACKGROUND OF THE INVENTION

A fuel cell converts chemical energy directly into electric energy by supplying a fuel and an oxidant to two electrically-connected electrodes and thus causing electrochemical oxidation of the fuel.

Noble metal catalysts such as a platinum catalyst and a platinum alloy catalyst have been used as the catalyst of the anode and cathode electrodes of a fuel cell. However, noble metal catalysts are scarce resources and it is expensive to use them for large-scale commercial production of fuel cells.

Catalytic reaction occurs on the surface of the particles only and the inside of the particles seldom participates in catalytic reaction. Therefore, the catalytic activity per unit mass of a noble metal catalyst particle is not always high.

Catalyst particles having a structure in which a core particle is covered with an outermost layer, that is, a so-called "core-shell structure" can increase the catalytic activity per unit mass of a noble metal catalyst. Catalyst particles having a core-shell structure can secure catalytic activity and reduce cost by using a material with excellent catalytic activity (such as noble metal) as the outermost layer.

SUMMARY OF THE INVENTION

The present inventors have surprisingly uncovered that compositions comprising palladium (Pd) and tin (Sn), with the Pd:Sn molar ratio being in the range of e.g., about 1:4 to 3:1, exhibit exceptional catalytic activity e.g., in a hydrogen oxidation reaction.

According to an aspect of some embodiments of the present invention there is provided a composition, comprising a tin (Sn) film, wherein the Sn film is coated by a shell, wherein the shell: (i) comprises palladium (Pd) and Sn, wherein the Pd:Sn molar ratio is in the range of 1:4 to 3:1, respectively; and (ii) is characterized by a thickness of less than 50 nm.

In some embodiments, the thickness is in the range of 2 nm to 10 nm.

In some embodiments, the shell further comprises a platinum (Pt).

In some embodiments, the Pt and the Sn are present in the shell a molar ratio of 2:1 to 1:1, respectively.

In some embodiments, the shell is in the form of crystals having a median crystallite size in the range of 3.5 to 6 nm.

In some embodiments, the composition is characterized by an X-Ray Powder Diffraction which is devoid of peaks at positions that correspond to a pristine oxide of one or more Pt, Pd, and Sn elements.

In some embodiments, the composition further comprises a substrate, wherein the Sn film: (i) is deposited on at least one surface of the substrate; and (ii) is coated by the shell.

In some embodiments, the substrate is in the form of plurality of nanoparticles (NPs), wherein the plurality of NPs is characterized by a median size of from about 1 to about 50 nanometers.

In some embodiments, the substrate is a material selected from a carbon, a metal oxide, a polymer, or any combination thereof. In some embodiments, the carbon is selected from the group consisting of activated carbon, graphite, carbon nanotube, or any combination thereof.

In some embodiments, the Pd:Sn molar ratio in the shell is from 1:4 to 3:4, or 3:1 or 1:4 to 3:4.

In some embodiments, the composition is an electro-catalyst. In some embodiments, the electro-catalyst is capable of promoting a hydrogen oxidation reaction (HOR) with an onset potential of between about 0 mV in alkaline media. In some embodiments, the electro-catalyst is an anode of a fuel cell.

In some embodiments, the composition is characterized by a specific activity of at least 0.05 mA cm$^{-2}$ Pt.

In some embodiments, the composition is for use for the oxidation of a material selected from the group consisting of methanol, ethanol, formic acid, formaldehyde, dimethyl ether, methyl formate, hydrogen, glucose or any combination thereof.

According to another aspect of some embodiments of the present invention there is provided a method for oxidizing a material selected from the group consisting of methanol, ethanol, formic acid, formaldehyde, dimethyl ether, methyl formate, hydrogen, glucose, ammonia, and hydrazine, the method comprising contacting the disclosed composition in an embodiment thereof with the material.

In some embodiments, the oxidizing of the hydrogen is performed in an alkaline electrolyte solution.

In some embodiments, the alkaline electrolyte solution is characterized by a pH value of at least 11.

In some embodiments, the alkaline electrolyte solution is a sodium hydroxide (NaOH) solution.

According to another aspect of some embodiments of the present invention there is provided a hydrogen generator device comprising the disclosed composition in an embodiment thereof, the device being configured to oxidize at least one material selected from the group consisting of methanol, ethanol, formic acid, formaldehyde, dimethyl ether, methyl formate, or any derivative thereof, and of reducing protons to form a hydrogen.

In some embodiments, the device is further adapted to oxidize hydrogen, wherein the hydrogen is present in a mixture comprising a carbon monooxide.

According to another aspect of some embodiments of the present invention there is provided a fuel cell comprising an electro-catalyst composition, comprising a tin (Sn) film, wherein the Sn film is coated by a shell, wherein the shell comprises palladium (Pd) and Sn, having a molar ratio in the range of 1:4 to 4:1, or 1:2 to 4:1, respectively, wherein the catalyst is capable of catalyzing a hydrogen oxidation reaction.

In some embodiments, the fuel cell further comprises a membrane electrode assembly (MEA).

In some embodiments, the electro-catalyst is an anode in the fuel cell.

In some embodiments, catalyst is characterized by an electrochemically active surface area of at least 75 $m^2g^{-1}$.

According to another aspect of some embodiments of the present invention there is provided a process for manufacturing an electro-catalyst comprising a substrate having attached thereon an Sn film, wherein: (a) the Sn film is coated by an alloy comprising Pd and Sn, wherein the Pd:Sn molar ratio is in the range of 3:4 to 1:4, respectively, and (b) the substrate comprises one or more materials selected from carbon, a metal oxide, a polymer, or any combination thereof, the process comprising the steps of: (i) electro-depositing the Sn film on the substrate; and (ii) depositing the alloy on the Sn film; thereby obtaining the catalyst.

In some embodiments, step (ii) is performed by a process selected from electro-deposition or electroless deposition.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

In FIGS. 3A-D, the CVs and the HOR LSVs were recorded at 20 and 5 mV $s^{-1}$ scan rate; in FIGS. 3E-G the HOR LSVs were recorded from high to low potential at 1000 rpm, and the LSVs were recorded from higher to lower potential to avoid the hydrogen evolution reaction. The corresponding CVs of FIG. 3E are shown in FIG. 3F, as performed in 0.1 NaOH solution at a scan rate of 20 mV $s^{-1}$; and the Tafel plots are shown in FIG. 3G.

FIG. 16D) of CNTs/NCDs decorated with $Pt_3Pd_3Sn_2$; NCD: nanocrystalline diamond; CNT: carbon nanotube. Bars: FIG. 16A: 0.2 μm; FIG. 16A: 50 nm; FIG. 16C: 20 nm.

DETAILED DESCRIPTION OF THE INVENTION

Figure 1:
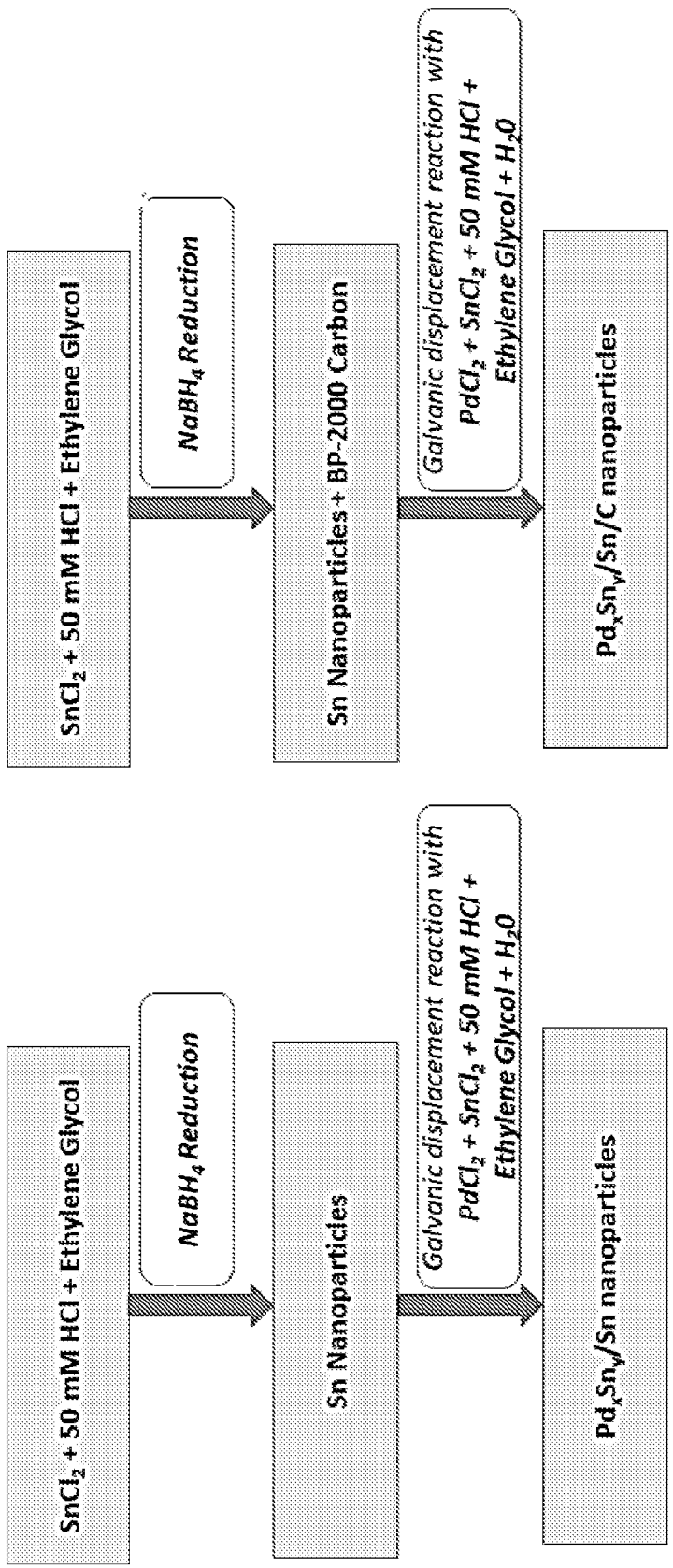
FIG. 1 presents a flow chart showing a non-limiting exemplary synthetic procedure used for preparing palladium (Pd) and tin (Sn) based nanoparticle catalysts on a film with (right panel) and without (left panel) carbon support.

The present invention, in some embodiments thereof, relates to palladium-tin based catalysts.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The Composition

The present inventors have successfully designed, inter alia, a core-shell structure in which the core particle comprises a tin (Sn) film or nanoparticles thereof (hereinafter the core may be referred to as "Sn core") covered with the outermost layer comprising palladium (Pd) or an alloy thereof (Pd alloy) (hereinafter the outermost layer may be referred to as "Pd shell").

As exemplified herein, the disclosed catalyst in some embodiments thereof displays a superior performance for various electro-oxidation reactions.

A) Palladium-Tin Catalyst Composition

According to an aspect of some embodiments of the present invention there is provided a composition comprising a metal, wherein the metal is coated by a shell, wherein the shell: (a) comprises at least 40% palladium, at least 50% palladium, at least 60% palladium, or at least 70% palladium by molarity, and (b) has at least one nanosized dimension (e.g., sell's thickness).

In some embodiments, the metal is selected from, without being limited thereto, a chromium, cobalt, tin (Sn), molybdenum, tungsten, nickel, or any combination thereof. In some embodiments, the cobalt or the chromium are in the form of a particle.

In some embodiments, the metal comprises Sn.

In some embodiments, the molybdenum, the tungsten, or the nickel, are in the form of an alloyed film. In some embodiments, the Pd or the PdSn coating are deposited on e.g., carbon (e.g., high surface carbon as described herein) or on a supporting metal.

In some embodiments, the shell comprises Pd and Sn. In some embodiments, the shell comprises Pd and Sn, wherein the Pd:Sn molar ratio is in the range of 1:6 to 6:1, respectively. In some embodiments, the Pd:Sn molar ratio is in the range of 1:4 and 4:1, respectively. In some embodiments, the Pd:Sn molar ratio is 3:1, 2:1, 1:1, 1:2, 1:3, respectively, including any value and range therebetween.

In some embodiments, the shell is substantially devoid of platinum. By "substantially devoid of platinum" or "platinum free" it is meant to a concentration of less than 0.01%, by weight of platinum.

B) Palladium-Platinum Tin-Catalyst Composition

According to an aspect of some embodiments of the present invention there is provided a composition comprising Sn, wherein the Sn is coated by a shell, wherein the shell: (a) comprises platinum and palladium, and (b) has at least one nanosized dimension (e.g., sell's thickness).

In some embodiments, the core comprises Sn in the form of a film or a plurality of nanoparticles (hereinafter the core may be referred to as "Sn core"). The core or the nanoparticles may be covered with the outermost layer comprising at least one of platinum (Pt) or an alloy thereof (Pt alloy) (hereinafter the outermost layer may be referred to as "shell") and/or palladium (Pd) or an alloy thereof (Pd alloy) (hereinafter the outermost layer may be referred to as "Pd shell"). In some embodiments, the shell further comprises Sn. In some embodiments, the shell comprises Pd and further comprises Pt as described hereinthroughout. In some embodiments, the ratio of Pt (e.g., within the shell) to Sn (e.g., within the core) is from 10:1 to 1:10, or, in some embodiments, from 1:5 to 5:1, or in some embodiments, from 3:1 to 1:3, e.g., 3:1, 2:1, 1:1, 1:2, or 1:3, including any value and range therebetween.

In some embodiments, the shell comprises Pd, and Platinum (Pt). In some embodiments, the shell comprises Pd and Sn. In some embodiments, the shell comprises Pd and Sn in a (molar) ratio of from 1:4 to 4:1, including any range therebetween (see, e.g., the Examples section below). In some embodiments, the shell comprises Pd, Platinum (Pt), and Sn. In some embodiments, the Pt:Pd molar ratio is in the range of 4:1 and 1:4. In some embodiments, the Pt:Pd molar ratio is in the range of 2:1 and 1:2. In some embodiments, the Pt:Pd molar ratio is in the range of 3:2 and 2:3.

In some embodiments, the shell comprises Pt:Pd:Sn, wherein the molar ratio of Pt:Pd is as described hereinthroughout, and in the Examples section.

In some embodiments, the ratio of Pt:Sn ranges from 5:1 to 1:5, including any value and range therebetween. In some embodiments, the shell further comprises platinum such that the Pt:Sn molar ratio ranges from 2:1 to 1:2, about 4:3, respectively.

In some embodiments, the desired Pd to Sn ratio may be predetermined so as to fit the material to be coated or oxidized.

C) General Characterizations of Compositions A and B

A film or particle(s) coated by a shell may be characterized by a discrete inner and outer surfaces wherein the inner surface constitutes the boundary of the enclosed area or space. The enclosed area or space may be secluded from the exterior area of space which is bounded only by the outer surface.

In the context of the present invention, the closure of the enclosing entity may depend on the size, shape and chemical composition of the entity that is being enclosed therein, such that the enclosing entity may be "closed" for one entity and at the same time be "open" for another entity. For example, structures presented herein are closed with respect to certain chemical entities which cannot pass through their enclosing shell, while the same "closed" structures may be not closed with respect to other entities.

In some embodiments, the Sn has morphology of one or more particles. In some embodiments, the Sn is in the morphology of a film. In some embodiments, the Sn film is at least partially oxidized, e.g., being in the form of: SnO, or $SnO_2$.

In some embodiments, the term "film" refers to a flat or to a tubular structure e.g., a sheet having substantially greater area than thickness. In some embodiments, the film is a body having a thickness which is e.g., 2, 4, 6, 8, 10, or 20 times or smaller, including any value therebetween, than any of its length or width dimensions, and typically, but not exclusively, having an overall shape of a thin sheet.

As described hereinabove, in some embodiments, the shell is nanosized or comprises nanosized particles.

Hereinthroughout, the term "nanosized" refers to a structure (e.g., a particle or a film), featuring a size of at least one dimension thereof (e.g., diameter) that ranges from about 1 nanometer to 1000 nanometers.

In some embodiments, the shell is characterized by a thickness of 50 nm or less.

In some embodiments, the size of the shell described herein represents an average or a median size of a plurality of shells.

In some embodiments, the average or the median size of the shell (e.g., diameter, length, or thickness) ranges from about 1 nanometer to 500 nanometers. In some embodiments, the average size or median ranges from about 1 nanometer to about 300 nanometers. In some embodiments, the average or median size ranges from about 1 nanometer to about 200 nanometers. In some embodiments, the average or median size ranges from about 1 nanometer to about 100 nanometers. In some embodiments, the average or median size ranges from about 1 nanometer to 50 nanometers, and in some embodiments, it is lower than 35 nm. In some embodiments, the average size or median is about 1 nm, about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, about 21 nm, about 22 nm, about 23 nm, about 24 nm, about 25 nm, about 26 nm, about 27 nm, about 28 nm, about 29 nm, about 30 nm, about 31 nm, about 32 nm, about 33 nm, about 34 nm, about 35 nm, about 36 nm, about 37 nm, about 38 nm, about 40 nm, about 42 nm, about 44 nm, about 46 nm, about 48 nm, or about 50 nm, including any value and range therebetween.

Crystal Lattice and X-Ray Diffraction

As used herein and in the art a crystal lattice is unique periodic and systematic arrangement of atoms or ions found in a crystal in an ordered structure, and is represented by three-dimensional configuration of points connected by lines used to describe the orderly arrangement of the atoms or ions in a crystal. Each point represents one or more atoms in the actual crystal. The lattice is divided into a number of identical blocks, or unit cells, that are repeated in all directions to form a geometric pattern. Lattices are typically classified according to their dominant symmetries: isometric, trigonal, hexagonal, tetragonal, orthorhombic, monoclinic, and triclinic.

As used herein and in the art the unit cell is the smallest component of the crystal lattice and describes the 3D arrangement of atoms in a crystal.

The unit cell is represented in terms of its lattice parameters which are the lengths of the cell edges (a, b and c) and the angles between them (alpha, beta and gamma), while the positions of the atoms inside the unit cell are described by the set of atomic positions $(x_i, y_i, z_i)$ measured from a lattice point. X-ray Powder Diffraction (XRPD) is typically used to determine the crystal arrangement of a crystal lattice.

For example, X-ray powder diffraction patterns can be measured with an X-ray diffractometer Cu $K_\alpha$ or Cr $K_\alpha$ radiation by standard methods described, for example, by B. D. Cullity and S. R. Stock (Elements of X-ray Diffraction, 3rd ed., New York: Prentice Hall, 2001). The unit cell parameters can be determined by Rietveld refinement of the powder diffraction data. The X-ray crystalline size also can be determined by analysis of peak shifting or peak broadening in a powder diffraction pattern of a sample containing an internal Si standard using the single-peak Scherrer method or the Warren-Averbach method as discussed in detail, for example, by H. P. Klug and L. E. Alexander (X-ray Diffraction Procedures for Polycrystalline and Amorphous Materials, New York: Wiley, 1974, 618-694).

As discussed herein, an fcc structure of Pd and/or Pt includes a tin element included in a crystal lattice of the Pd and/or Pt.

In some embodiments, atoms of the Sn are introduced into the crystal lattice of the Pd and/or Pt. The inclusion of Sn in the crystal lattice of Pd and/or Pt is also referred to herein and in the art as "doping", with the tin being referred to as "dopant".

Doped, and non-doped Pd and/or Pt can be characterized by measurement of their X-ray powder diffraction patterns, elemental compositions, and average particle sizes. In some embodiments, crystal lattice parameters of doped or un-doped (pristine) Pd and/or Pt can be determined from powder X-ray diffraction ("XRPD") patterns.

In some embodiments, the shell comprises crystallites characterized by a crystallite size of 1 to 20 nm, or 1 to 10 nm. In some embodiments, the shell comprises crystallites characterized by a crystallite size of 1 nm, 2 nm, 3 nm, 4 nm, 5 nm, 6 nm, 7 nm, 8 nm, 9 nm, or 10 nm, including any value and range therebetween. In some embodiments, the shell comprises crystallites characterized by a crystallite size of 3.5 to 6 nm.

As used herein, the term "crystallite size" refers to at least one dimension of the crystallite.

In some embodiments, the term "crystallite size" refers to a median crystallite size of a plurality of crystallites.

In some embodiments, the term "crystallite size" is calculated by using Scherrer's equation from the obtained X-ray diffraction data, as further described hereinbelow in the Examples Section.

In some embodiments, the term "shell", refers to the coating domain surrounding the film.

By "film coated by a shell" it is meant to refer to a composition of two or more entities, namely an entity that defines an enclosure (the enclosing entity, i.e. the shell) and the entity (or entities) that is being at least partially enclosed therein, i.e. the film. In some embodiments, the coating may be conformal with the exact contour of the film. In some embodiments, the film comprises or is made of a plurality of particles.

In some embodiments, the composition, the shell, or, in some embodiments, the composition excluding the substrate and/or the film, is characterized by an X-Ray Powder Diffraction which is devoid of peaks at positions that correspond to a pristine oxide of at least one, or at least two elements selected from Pt, Pd, and Sn.

In some embodiments, the tin is in the form of nanoparticles, as described hereinthroughout.

In some embodiments, the tin film is in a dendritic form (also referred to "structure", or "shape", interchangeably).

The term "dendritic structure" herein employed refers to a structure in which a flake-shaped (flaky) substructures. In some embodiments, these structures are constituted by aggregation of particles are gathered in a large number while having branch points. In some embodiments, the length in lateral direction of one of the flaky substructures is 5 nm to 200 nm, or less. Incidentally, the term "length in lateral direction" herein employed refers to a smallest dimension within a plane of one flake. In general, dendritic compounds comprise a core and/or a focal point and a number of generations of ramifications (also known and referred to as "branches" or "branching units") and an external surface. The generations of ramifications are composed of repeating structural units, which extend outwards radially from the core or the focal point. Dendrimers are also referred to in the art as structures characterized by a tree-like structure and are built from several dendron units that are all connected to a core unit via their focal point. Dendritic macromolecules typically possess a perfectly cascade-branched, highly defined, synthetic structure, characterized by a combination of high-group functionalities and a compact molecular structure.

In some embodiments, Sn film is in the form of a dendritic structure having a stem and branches characterized by a ratio ranging from 1:1 to 10:1, respectively. In some embodiments, Sn film is in the form of a dendritic structure having a stem and branches characterized by a ratio in the range of 1:1 to 5:1, or to 50:1, respectively.

In some embodiments, the term "alloy" refers to a monophasic or polyphasic metallic material of a binary or polynary system. The starting components (alloy elements) may enter into metallurgical interactions with one another and thereby lead to the formation of new phases (e.g., mixed crystals, intermetallic compounds, and superlattice).

In some embodiments, the alloy can include deposition of two or more materials, so as to form a di-segmented nanostructure (e.g., if two or more target metals are deposited sequentially), a tri-segmented nanostructure (e.g., if three or more target metals are deposited sequentially), etc. In some embodiments, at least one of the deposited metals may be etched.

In some embodiments, the disclosed composition, when used as a catalyst allows to enhance the electro-oxidation process due to the synergistic effect of Sn on the noble active metal.

A Substrate

In some embodiments, the composition further comprises a substrate. Without being bound by any particular theory, it is assumed that the durability of the catalyst may be improved because of the "anchoring" effect of the Sn to a substrate e.g., a carbon support.

In some embodiments, the Sn film is deposited on at least one surface of the substrate. In some embodiments, one or a plurality of core-shell structures are incorporated in and/or on at least a portion of the substrate.

That is, in some embodiments, there is provided a composition comprising: an Sn film, a material comprising one or more active metal nanoparticles (NPs), and a substrate, wherein the Sn film:
(a) is deposited on at least one surface of the substrate;
(b) is coated by other material comprising the one or more metal NPs.

Herein, in some embodiments, a plurality of the NPs is characterized by a size of from about 1 to about 100 nanometers, or from about 1 to about 50 nanometers, or in some embodiments, from about 1 to about 10 nanometers. Herein, the term "size" may refer to either the average of at least e.g., 70%, 80%, or 90% of the particles, or in some embodiments, to the median size of the plurality of nanoparticles.

Accordingly, in some embodiments, the composition comprises an Sn film, an alloy comprising Pd and Sn deposited on at least portion of the film, wherein the Pd:Sn molar ratio is in the range as described hereinabove, and a substrate, wherein the Sn film is:
(a) deposited on at least one surface of the substrate;
(b) coated by the alloy described herein in an embodiment thereof.

Hereinthroughout, the expression "deposited on at least one surface" is also referred to herein, for simplicity, as a coating on substrate, a substrate or surface having a film deposited thereon, or on a portion thereof. In some embodiments, the Sn film is incorporated in and/or on at least a portion of the substrate. Herein the term "coating" and any grammatical derivative thereof, is defined as a coating that: (i) is positioned above the substrate, (ii) is not necessarily in contact with the substrate, that is to say, one or more intermediate coatings may be arranged between the substrate and the coating in question (however, it may be in contact with the substrate), and (iii) does not necessarily completely cover the substrate.

Substrate usable according to some embodiments of the present invention can have, for example, organic or inorganic surfaces.

In some embodiments, the substrate is selected from, but is not limited to, carbon, a metal oxide (e.g., $SnO_2$), a polymer, or any combination thereof.

Non-limiting exemplary substrates are selected from activated carbon, graphite, carbon nanotube, metal mesh or foam, ceramic materials, or any combination thereof.

In some embodiments, the composition described herein is a catalyst, or is identified for use as a catalyst or as an electro-catalyst.

In some embodiments, the electro-catalyst is a fuel cell catalyst electrode. In some embodiments, the electrode is the anode.

In some embodiments, the disclosed catalyst, in an embodiment thereof, is characterized by a specific activity of: at least 0.05 mA cm$^{-2}$ Pt, at least 0.02 mA cm$^{-2}$ Pt, at least 0.03 mA cm$^{-2}$ Pt, at least 0.04 mA cm$^{-2}$ Pt, at least 0.05 mA cm$^{-2}$ Pt, at least 0.06 mA cm$^{-2}$ Pt, at least 0.07 mA cm$^{-2}$ Pt, at least 0.08 mA cm$^{-2}$ Pt, at least 0.09 mA cm$^{-2}$ Pt, or at least 0.1 mA cm$^{-2}$ Pt.

The term "specific activity" as used herein refers to current density (mA/cm$^2$) per cm$^2$ of the accessible electrochemical surface area of a catalyst in an electrode.

Oxidation Method

According to an aspect of some embodiments of the present invention there is provided an oxidation method comprising the steps of: (a) contacting an electrode comprising the composition with a material to be oxidized, and optionally (b) applying an electric potential on the electrode.

In some embodiments, the composition (e.g., when used as an electrode in a fuel cell) is capable of catalyzing the oxidation reaction of a material selected from, without being limited thereto, a hydrogen, an ammonia or a hydrazine. In some embodiments, the disclosed catalyst in an embodiment thereof, is capable of catalyzing a hydrogen oxidation reaction.

In some embodiments, the hydrogen oxidation reaction is catalyzed by an electro-catalyst comprising a structure having a core and a shell as disclosed herein in an embodiment thereof, wherein the shell further comprises Pt.

The Fuel Cell

According to an aspect of some embodiments of the present invention there is provided a device having an electro-catalyst comprising the disclosed composition in an embodiment thereof. In some embodiments, the electrocatalyst is the anode. In some embodiments, the device is a fuel cell.

In some embodiments, the term "electro-catalyst" refers a specific form of a catalyst that functions at electrode surfaces or, in some embodiments, may be the electrode or the electrode surface itself.

In some embodiments, the term "fuel cell" or "fuel cell system" refers to a device that converts the chemical energy from a fuel into electricity through a chemical reaction of positively charged hydrogen ions with oxygen or another oxidizing agent.

The present inventors have now surprisingly uncovered that the disclosed electro-catalyst enhances various oxidation reactions, such as hydrogen oxidation reaction.

In some embodiments, the fuels are delivered to the disclosed fuel cell in high vapor pressure (low boiling point), enabling their supply as fumes/gas directly to the cell anode. In some embodiments, the electrode preparation methods described herein, may be utilized in manufacturing other types of fuel cells, including, without limitation, phosphoric acid fuel cells, polymer electrolyte fuel cells, and alkaline fuel cells. In some embodiments, the fuel cell is an alkaline fuel cell.

In some embodiments, the hydrogen oxidation reaction is performed in an alkaline electrolyte solution.

In some embodiments, the disclosed catalyst allows catalyzing the hydrogen oxidation reaction in an alkaline fuel cell. In some embodiments, the disclosed fuel cell comprises 0.1M electrolyte comprising $OH^-$ ions.

In some embodiments, the alkaline electrolyte solution has a pH value of at least pH 11. In some embodiments, the alkaline electrolyte solution has a pH value of at least pH 12. In some embodiments, the alkaline electrolyte solution has a pH value of at least pH 13. In some embodiments, the alkaline electrolyte solution is a sodium hydroxide (NaOH) solution. In some embodiments, the hydroxide concentration is in the range of 0.001M to 3M. In some embodiments, the hydroxide concentration is in the range of 0.01M to 1M. In some embodiments, the hydroxide concentration is in the range of 0.05M to 0.5M. In some embodiments, the hydroxide concentration is in the range of 0.08M to 0.12M. In some embodiments, the hydroxide concentration is approximately 0.1M.

In some embodiments, the electro-catalyst is characterized by an improved electrochemical active surface area. Herein, the "electrochemical active surface area" of a catalyst is evaluated by the level of potential dependent adsorption/desorption of hydrogen or CO to its surface. In some embodiments, the electrocatalyst is characterized by an electrochemically active surface area of e.g., at least 30 $m^2g^{-1}$ at least 40 $m^2g^{-1}$, at least 50 $m^2g^{-1}$, at least 60 $m^2g^{-1}$, at least 75 $m^2g^{-1}$, or at least 80 $m^2g^{-1}$. In some embodiments, the electrocatalyst is characterized by an electrochemically active surface area of e.g., 30 $m^2g^{-1}$, 40 $m^2g^{-1}$, 50 $m^2g^{-1}$, 60 $m^2g^{-1}$, 75 $m^2g^{-1}$, or 80 $m^2g^{-1}$, including any value and range therebetween.

In exemplary embodiments (as exemplified bellow), the catalyst in the fuel cell comprises a carbon supported Sn-based catalyst comprising a Pd—Sn alloyed shell. In some embodiments, the disclosed fuel cell is characterized by an onset potential in the range of from 10 to 40 mV.

In some embodiments, the disclosed fuel cell is characterized by an onset potential in the range of from 0 to 30 mV. In some embodiments, the fuel cell is characterized by an onset potential of approximately 20 mV.

In some embodiments, the disclosed fuel cell is characterized by a peak of current-density (e.g., for the oxidation of methanol, methyl formate, and formic acid at 0.75 V) in the range of 200 to 300, or 210 to 270 mA/mg.

In some embodiments, the disclosed fuel cell provides a current density in the range of 10 to 50 $mA/cm^2$.

In some embodiments, the peak of power density delivered by fuel cell using the disclosed catalyst for HOR is between 50 $mW\ cm^{-2}mg^{-1}$ to 70 $mW\ cm^{-2}mg^{-1}$, e.g., 50, 55, 60, 65, or 70 $mW\ cm^{-2}mg^{-1}$, including any value and range therebetween.

The disclosed fuel cells may efficiently perform with various air cathodes (e.g., having different catalysts) and with various solid membrane separators. A fuel cell system containing a uniquely designed solid membrane separator may also be practiced.

In some embodiments, the fuel cell comprises a membrane electrode assembly (MEA), as further described in the "Examples" section below.

In some embodiments, the disclosed catalyst may be used in a fuel cell that uses a liquid alkaline electrolyte.

In some embodiments, the disclosed catalyst may be used in a fuel cell having an acid as an electrolyte, e.g., phosphoric acid fuel cells (PAFC) or proton electrolyte membrane fuel cell (PEMFC).

In some embodiments, the fuel cell system described herein operates at room temperature, although higher temperatures are also contemplated, e.g., 30° C., 35° C., 40° C., 45° C., 50° C., 55° C., 60° C., 65° C., or 70° C., including any value and range therebetween.

The catalyst described herein may be introduced into a reformed fuel cell system. For example biofuels may be used in these reformed fuel cell system as the primary fuel, wherein a means of recovering hydrogen gas is required. In some embodiments, the disclosed catalyst may be used in carbon monoxide contaminated fuel.

In some embodiments, the fuel cell is used for the oxidation of fuels, such as, and without being limited thereto, methanol, ethanol, formic acid (FA), formaldehyde, and glucose.

In some embodiments, the disclosed fuel cell is characterized by HOR half-wave potential of 30 to 60, e.g., 30, 35, 40, 45, 50, 55, or 60 mV, including any value and range therebetween. In some embodiments, the disclosed fuel cell is further characterized by about 0.0 mV HOR onset potential.

In some embodiments, the device is fuel cell like structure (comprising, for example, MEA-membrane electrode assembly) comprising e.g., in the anode, the disclosed composition in an embodiment thereof e.g., PtPdSn (in any ratio thereof) on carbon or on $SnO_2$.

In some embodiments, the disclosed device has a fuel cell-like structure (e.g., MEA-membrane electrode assembly) capable of oxidizing one or more members selected from, without being limited thereto, DME, methanol, MF, and FA, etc. on the anode, and of reducing protons so as to produce pure hydrogen on the cathode.

As demonstrated in the Examples section below, the disclosed compositions may be used as highly CO tolerant catalysts, and may be used in the same device as disclosed herein to oxidize $H_2$ being present in a $H_2$+CO mixture. Hence, in some embodiments, by using the disclosed compositions in embodiments thereof, pure $H_2$ can be oxidized in a typical PEMFC which is typically easily poisoned by e.g., about 10 ppm CO in the anode stream.

In some embodiments, by "$H_2$+CO mixture" it is meant to refer to a mixture comprising $H_2$ and at least 0.1 ppm, at least 1 ppm, at least 10 ppm, at least 20 ppm, at least 30 ppm, at least 40 ppm, or at least 50 ppm up to 1% vol, of CO.

A Preparation Method

In some embodiments, there is provided a process for manufacturing the disclosed catalyst or electro-catalyst, e.g., electro-catalyst comprising a substrate as described above, having attached thereon an Sn film, wherein: the Sn film is coated by one or more active metal NPs and optionally by an element selected from, without being limited thereto, Sn, ruthenium (Ru), selenium (Se), or any combination thereof. In some embodiments, the Sn film is coated by an alloy comprising Pd and Sn. In some embodiments, the Sn film is coated by Pd, Pt and Sn. In some embodiments, the Sn film is coated by Pd and Pt. In some embodiments, the Sn film is coated by Pd. In some embodiments, the Sn film is made of a plurality of nanoparticles.

In exemplary embodiments, the film, and/or the PdSn particles are supported on a high surface area carbon substrate e.g., volcanized XC-72.

In some embodiments, the process comprising the steps of: (i) electrodepositing the Sn film on the substrate, and (ii) depositing the active metal alloy on the Sn film. In some embodiments, step (ii) is performed by an electro-deposition. In some embodiments, step (ii) is performed by an electroless deposition.

In some embodiments, "electroless deposition (or plating)" refers to a catalytic or autocatalytic process by which a chemical reducing agent reduces a metallic salt onto specific sites of a catalytic surface which can either be an active substrate or an inert substrate seeded with a catalytically active metal. In some embodiments, "electroless deposition (or plating)" refers to a chemical process of oxidation and/or reduction by which a metallic ion is reduced from a solution using the surface as a reducing agent with no need to transfer a current.

In some embodiments, the step of deposition may be performed by galvanic displacement.

Herein, in some embodiments, by "solution" it is meant to refer to an aqueous solution. In some embodiments, by "solution" it is meant to refer to a solution comprising a protic solvent. In some embodiments, the solution is a non-aqueous comprising a solvent selected from, without being limited thereto, ethylene glycol, propylene glycol, or mixture of protic solvents (which may comprise comprising e.g., ethanol, water and acid).

In some embodiments, electroless deposition provides a method for controlled deposition of Pd or other metal atoms on Sn previously deposited on a carbon support. In some embodiments, it becomes possible to chemically deposit Pd onto Sn or vice versa, resulting in the formation of nanosized (e.g., 5 to 20 nm) particles. In this manner, the required loading of Pd necessary for satisfactory fuel cell performance may be dramatically lowered, resulting in significant savings on fuel cell costs. In some embodiments, the reducing agent is the Sn and the electrolyte is assisting in the reduction process. In some embodiments, Sn is first fabricated using a reducing agent to chemically reduce the Sn and then these active Sn allows reduce Pd ions by an electroless process (also known as "atomic displacement", that is, displacing Sn surface atoms by Pd via redox reaction).

In some embodiments, the use of electroless deposition to fabricate Pd-containing catalysts results in the formation of small particles that possess core-shell geometry. This geometry may offer the possibility of improving many aspects of fuel cell performance. In accordance with certain aspects of the present disclosure, the core may comprise a metal other than Sn. Without being bound by any particular theory, it is assumed that if the Pd shell thickness is thin enough, the core metal may be close enough to the surface to perturb the physical properties of the Pd surface layer (shorter Pd—Pd lattice parameters) and electronic properties of the surface Pd sites (Pd orbital electron density).

In some embodiments, step (ii) is performed by a technique which is useful for depositing metallic coatings onto substrates, for example, and without being limited thereto, sputtering, chemical vapor deposition, ion beam enhanced deposition, plasma-assisted vapor deposition, cathodic arc deposition, ion implantation and evaporation.

In some embodiments, step (ii) is performed by chemical reduction. There are several different reducing agents that can be used for reducing Sn in accordance with the present disclosure that include, but are not limited to, sodium hypophosphite, ethylene glycol e.g., by the polyol method, hydrazine, dimethyl-amine borane, diethyl-amine borane, sodium borohydride, formaldehyde, and hydrogen gas.

In some embodiments, the deposition is performed by a technique which is useful for depositing metallic coatings onto substrates, for example, and without being limited thereto, sputtering, chemical vapor deposition, ion beam enhanced deposition, plasma-assisted vapor deposition, cathodic arc deposition, or ion implantation and evaporation.

In some embodiments, the electrochemical deposition is accomplished by the reduction of metal ions from an electrolytic solution through the application of a negative potential. This may be performed, for instance, at cyclic voltammetry mode, galvanostatic mode (constant current), or potentiostatic (constant voltage) mode or cyclic-voltammetry conditions.

As a specific embodiment, the method for preparing a PdSn nanoparticle catalyst includes: preparing a precursor solutions of Pd and Sn salts.

In another specific embodiment, the solution for galvanic deposition of PdSn alloy on Sn is prepared by dissolving $PdCl_2$ and $SnCl_2$ (e.g., in HCl, ethylene glycol and/or water).

Further embodiments of this section are presented in the Examples section below.

General

As used herein the terms "about" and "approximately" refers to ±10%.

The terms "comprises", "comprising", "includes", "including", "having" and their conjugates mean "including but not limited to". The term "consisting of means "including and limited to". The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, electrochemical, and electronical arts.

In those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

EXAMPLES

Reference is now made to the following examples, which together with the above descriptions illustrate some embodiments of the invention in a non-limiting fashion.

Catalysts focusing on a variety of bimetallic catalysts of Pd with transition metals such as Co, Ni, Cr, and Sn were studied. Screening of these catalyst systems suggested that Pd—Sn system exhibits the lowest onset potential for hydrogen oxidation (HOR). Next, various compositions of Pd—Sn catalysts (PdSn, PdSn/Sn, and PdSn/Sn/C) were optimized towards HOR reaction. Further optimization of the catalyst synthesis procedure leaded to the very active phase of Pd—Sn.

Materials

NaOH was obtained from Merck, $PdCl_2$ from Alfa Aesar, $SnCl_2$ and $K_2PtCl_4$ from Sigma Aldrich, $NaBH_4$ from Acros Organic, aQAPS-S14 ionomer from Shanghai Hephas Energy Equipment were used without any further purification. High purity (18.2 MΩ) double distilled water (DDW) was used.

Potassium tetrachloroplatinate (99.9%) and palladium chloride (99.9%) were purchased from Strem Chemicals. Ethylene glycol (99.5%), sulfuric acid (95-97%) and lithium chloride (99.0%), and methyl formate were purchased from Merck. Tin chloride (99.9%) was purchased from Sigma Aldrich. All reagents were analytical grade and were used without any further purification. Deionized water having a resistivity of ~18.0 MΩ cm was used for all experiments. Toray carbon sheet (TGP H090) and teflonized carbon paper (LT1400W, ELAT®GDL microporous layer) were purchased from TheFuelCellStores.com and E-Tek DivisionSM, respectively.

Example 1

Electrocatalyst Preparation Procedure

Preparation of Pd/Ni-M catalysts (M=Mo, W):

In exemplary procedures, Ni-M (M=Mo, W) alloy film was electrodeposited on Au disk electrode from a bath solution containing 0.1 M $NiSO_4$, 0.5 M $CoCl_2$/$CrCl_2$/$Na_2WO_4$/and 0.6 M $Na_3C_6H_5O_7$. A constant reduction potential was applied for the deposition process. Pd electroless deposition was carried out on the electrodeposited film by immersion of the Ni-M alloy film in 5 mM $PdCl_2$ solution for 5 minutes. The Pd overlayers on Ni-M films were characterized by polarization measurements after washing with water and ethanol; "-" denotes alloyed metals, and "x/y" denotes a coated material, in which y is coated by x.

Preparation of PdCo and PdCr Catalysts:

Aqueous metal salt solution (5-10 mM Palladium Chloride dissolved in 50 mM HCl) was added to the HF etched Co/Cr nanoparticles and stirred continuously for 1 hour. After the completion of galvanic displacement reaction (Pd reduce on the surface of Co/Cr particles by displacing the transition metal atoms). The solid Pd coated Co and Pd coated Cr nanoparticles were separated from the aqueous solution and washed 3 times with distilled water and 2 times with absolute ethanol. Thus, the obtained solid particles were dried at 80° C. under vacuum and further used for characterization and preparation of catalyst inks.

Preparation of PdSn, PdSn/Sn and PdSn/Sn/C Catalysts:

In a typical synthesis, $SnCl_2$ was dissolved in 100 ml of acidified ethylene glycol. 50 ml of 100 mM $NaBH_4$ containing ethylene glycol solution was added and mixed thoroughly for about 15 minutes in room temperature to yield Sn nanoparticles. Subsequent to the formation of Sn nanoparticles, ethylene glycol solution containing dissolved $PdCl_2$, $SnCl_2$ and HCl was added and allowed to react until the solution turns colorless.

When the process was completed, $Pd_xSn_y$/Sn particles were centrifuged and washed with deionized water and ethanol mixture several times to remove any possible residual impurities and were thereafter dried. For carbon supported particles SnCl₂ impregnated carbon was used to produce carbon supported Sn nanoparticles in the first step (see FIG. 1) and other steps were repeated as described above yielding Pd$_x$Sn$_y$/Sn/C. Control samples were prepared by direct NaBH$_4$ co-reduction of PdCl$_2$ and SnCl$_2$; the values for x and y may be in the range of 1 to 5.

Various compositions synthesized were presented in Table 1 presenting nominal compositions of the precursors used for the synthesis of various catalysts.

TABLE 1

| Catalysts | Atomic Pt | Atomic Sn | Atomic Pd |
|---|---|---|---|
| Pt | 100.0 | 0.0 | 0.0 |
| PtSnPd | 50.0 | 25.0 | 25.0 |
| PtSnPd | 50.0 | 37.5 | 12.5 |
| PtPd | 50.0 | 0.0 | 50.0 |
| PtSn | 50.0 | 50.0 | 0.0 |
| Pd | 100.0 | 0.0 | 0.0 |

Example 2

Characterization

The XRD studies were performed using a PANalytical 'X' pert PRO diffractometer with Cu Kα 1 radiation. The electrochemical measurements (cyclic voltammetry, linear sweep voltammetry, and CO-stripping) were performed in a CHI work station (CHI from the USA) in three electrode configuration.

Figure 2:
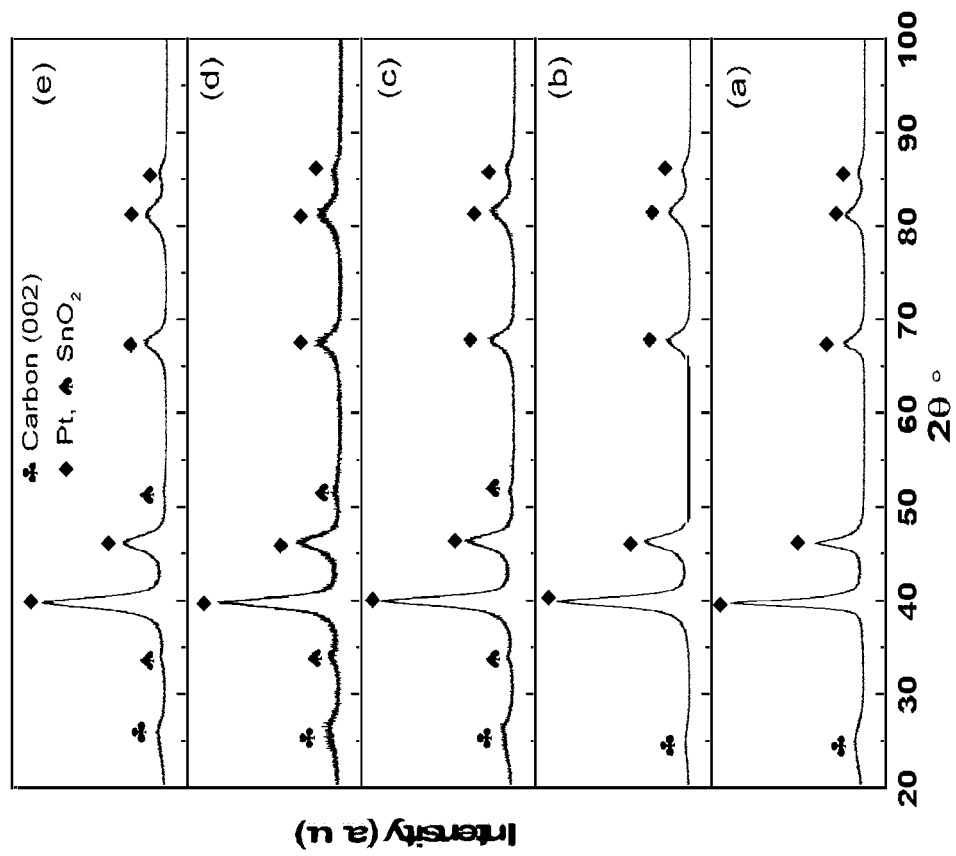
FIG. 2 presents X-ray diffraction (XRD) patterns of Pd/C ("a"), Pt/C ("b"), PtSn/C ("c"), Pt ("d"). The peak at ~25° is the reflection from graphite (101) plane; ♣ denotes: reflection from graphite (002), ♦ denotes: reflections from the fcc phase of Pt or Pd, and ♠ denotes: reflections from the $SnO_2$ phase.

The X-ray diffraction patterns of the as-prepared catalysts are shown in FIG. 2. The XRD patterns of Pt/C and Pd/C is also included in the same FIG. 2. The peaks at 2θ equal to 39.7, 46.1, 67.3, 81.2, and 85.7 are the reflections from (111), (200), (220), (222), and (311) planes of the face centered cubic lattice of Pt and Pd, respectively (JCPDS: 04-0802 for Pt, JCPDS: 05-0681 for Pd).

The lattice parameter and atomic radii of both Pd and Pt are very close and both crystalize in the fcc structure. Therefore, the XRD patterns are almost similar (FIG. 2 (a, b)). All the XRD patterns exhibit the characteristic Pt and Pd patterns. The reflection at 34 and 51.7 is attributed from the tetragonal SnO$_2$ phase (FIG. 2(c-e)). The presence of Pt, Pd, and SnO$_2$ phases are verified from the XRD patterns. The similar XRD patterns of Pt—Sn—Pd catalysts prepared by conventional NaBH$_4$ reduction is reported.

The crystallite size calculated according to the following equation:

$$\tau = k\lambda/((\beta \cos \theta)$$

where τ is the crystallite size, λ is the wavelength of X-ray, β is the full width at half maximum (FWHM), θ: Bragg's angle and k is the shape factor and it is taken as 0.9, from the (220) peak broadening using Scherer formula is given in Table 2 showing the crystallite size of the catalysts calculated from the (220) peak broadening of XRD pattern.

TABLE 2

| Catalysts | Crystallite size (nm) |
|---|---|
| Pd/C | 5.46 |
| Pt/C | 4.69 |
| PtSn/C | 4.77 |
| Pt$_4$Sn$_3$Pd/C | 4.40 |
| Pt$_2$SnPd/C | 4.33 |

The crystallite size of all the catalysts was in the range of ~4 to 5.7 nm. The crystallite size of catalysts decreases in comparison to Pt or Pd in PdSnPt catalysts. However, the PtSn/C crystallite size increases compared to that of Pt/C.

Example 3

Quantification of Metals and Electrochemical Testing of Catalyst Particles

Quantification of metal particles in the catalysts has been performed using the Inductively Coupled Plasma-Optical Emission Spectroscopy (ICP-OES) results. Catalyst particles were dissolved in Aqua media and appropriately diluted before ICP-OES measurements.

Two mg of catalyst were impregnated into 3 mg of carbon followed by addition of 10 μl of Quaternary Ammonium Poly Sulphone (QAPS) ionomer (HEPHAS energy company, Sanghai-China). The catalyst impregnated carbon was dispersed in 2.5 ml of isopropyl alcohol and continuously stirred for 24 h.

The catalyst ink was sonicated for 10 minutes every time before fabricating the catalyst layer. A 5 μL aliquot of catalyst suspension was pipetted onto a 4 mm diameter glassy carbon disk electrode (geometric area—0.125 cm$^2$, ALS-Japan) and was used as the working electrode. After drying in air for 20 minutes, the catalyst loading on the disk electrode was 50 μg/cm$^{-2}$. Au wire (99.99%) and Hg/HgO electrode (BASi®) were used as counter and reference electrodes, respectively. CHI 760c potentiostat was used to perform electrochemical measurements.

In additional exemplary procedures, the electrochemical activity of the catalysts was evaluated in the three electrode rotating disk electrode configuration. FIGS. 3A-D show the cyclic voltammograms (CVs) and hydrogen oxidation linear sweep voltammograms (LSVs) on these catalysts. The CVs shows the typical features of precious metals (Pt and Pd). The HOR LSVs were recorded from high to low potential to avoid the contribution from hydrogen evolution reaction. The electrochemical active surface area (ECSA) was estimated from the hydrogen desorption (H$_{des}$) charge and given in Table 3 below presenting the summary of the electrochemical parameter estimated on Pt/C, Pd/C, Pt$_4$Sn$_3$Pd/C, Pt$_2$SnPd/C, PtPd/C, PdSn/C, and Pd/C.

The 210 μC cm$^{-2}$ charge was used for monolayer adsorption of hydrogen to calculate the ECSA:

$$ECSA(m^2 g^{-1}) = Charge\ 210\ \mu C\ cm^{-2}/(scan\ rate \times H_{des}\ charge \times Loading)$$

All the catalysts exhibit 0.0 mV onset potential for HOR except Pd where 109 mV shift is observed. This indicates the sluggish HOR kinetics of Pd compared to that of other catalysts. The lowest half-wave potential of HOR of 43 mV was observed with Pt$_3$Sn$_3$Pd/C catalysts with low ECSA in line with high specific activity for HOR (Table 3) compared to that of Pt$_2$SnPd/C.

TABLE 3

| Catalysts | ECSA (m$^2$ g$^{-1}$) | HOR onset potential (mV) | HOR half-wave potential (mV) |
|---|---|---|---|
| Pd/C | 58.7 | 106 | 289 |
| Pt/C | 37.4 | 0.0 | 100.0 |
| *PtPd/C | 48.8 | 0.0 | 100.0 |

TABLE 3-continued

| Catalysts | ECSA $(m^2\,g^{-1})$ | HOR onset potential (mV) | HOR half-wave potential (mV) |
|---|---|---|---|
| PtSn/C | 43.3 | 0.0 | 71.0 |
| *Pt$_4$Sn$_3$Pd/C | 31.4 | 0.0 | 43.0 |
| *Pt$_2$SnPd/C | 41.6 | 0.0 | 48.0 |

*Loading of Pt and Pd taken for ECSA calculation

Figure 3A:
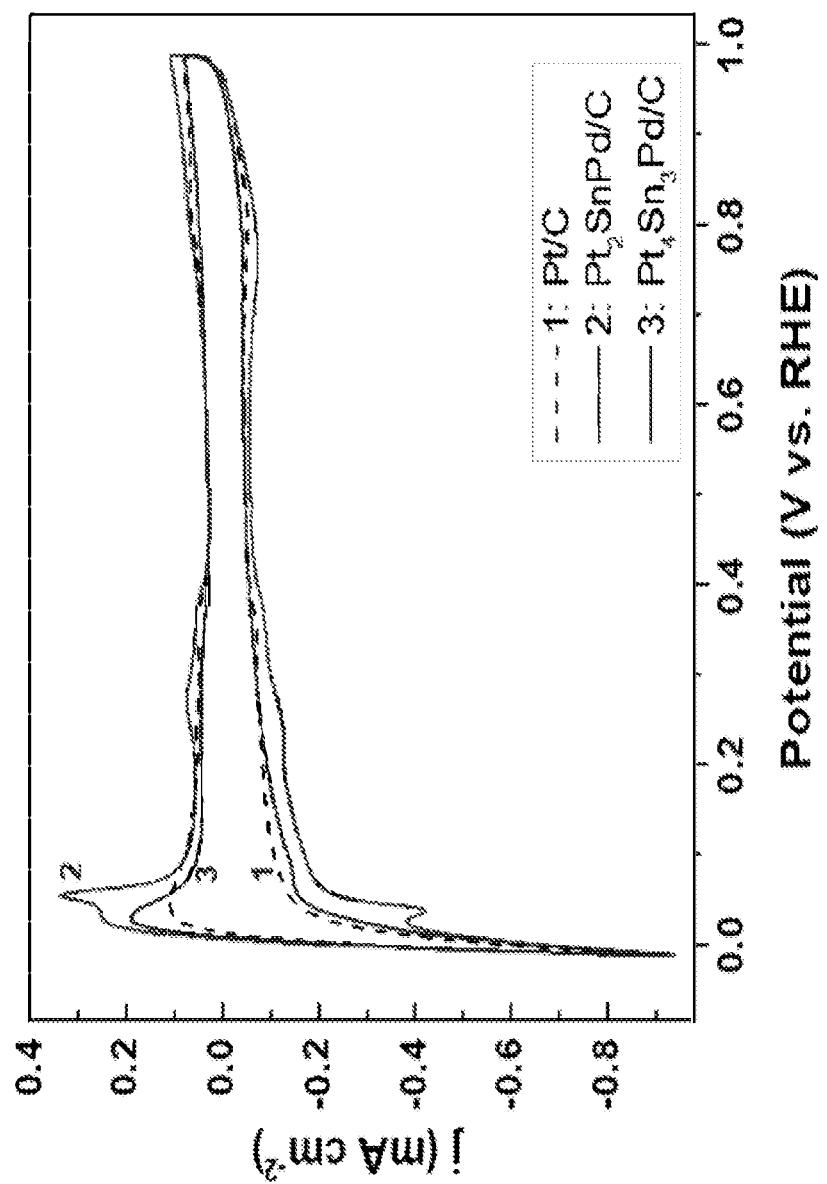
FIGS. 3A-3G present cyclic voltammograms (CVs) (FIGS. 3A and 3B) and hydrogen oxidation (HOR) linear sweep voltammograms LSVs (FIGS. 3C-3G) of: Pt/C, Pd/C, $Pt_4Sn_3Pd/C$, $Pt_2SnPd/C$, PtPd/C, PtSn/C, and Pd/C (FIGS. 3C-D) in $N_2$ and $H_2$-saturated 0.1 M NaOH solution; and, Pt/C, $Pt_1Pd_1SnO_2/C$ and Pd/C (FIGS. 3E-G) at a scan rate of 5 mV $s^{-1}$ at 1000 rpm.
Figure 3B:
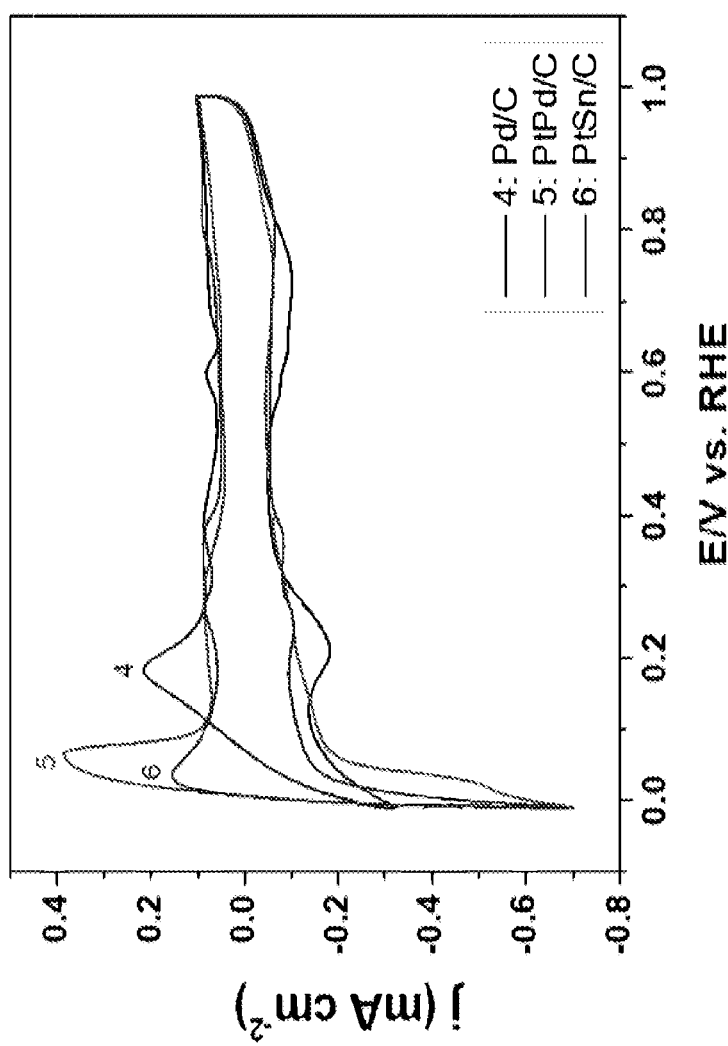
Figure 3C:
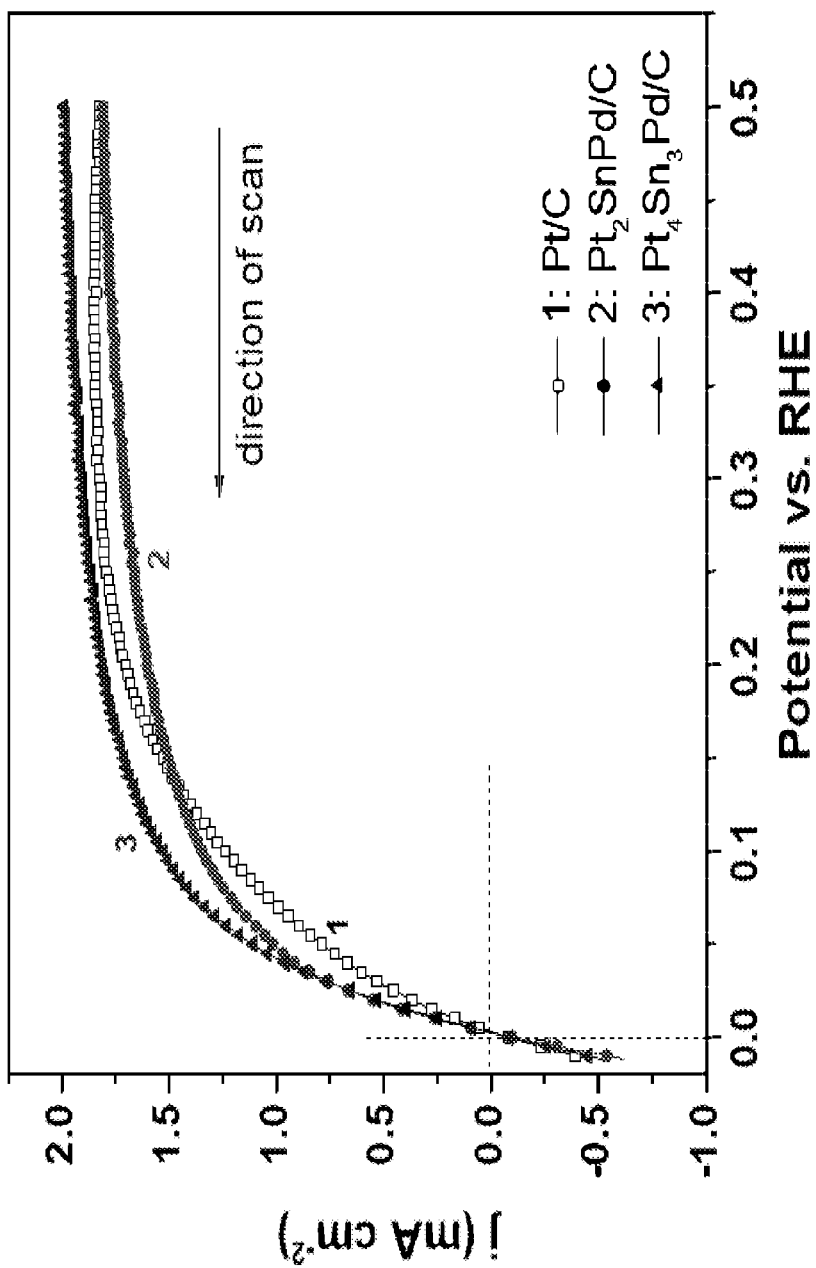
Figure 3D:
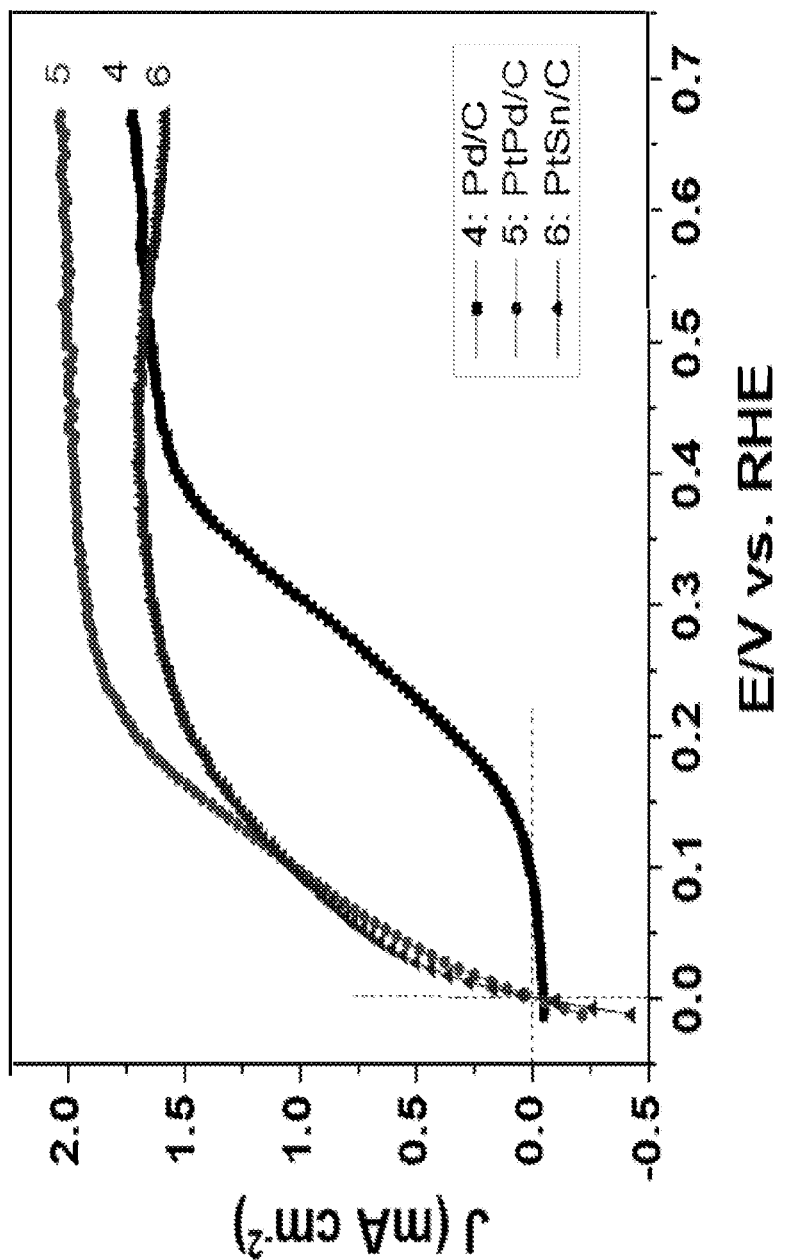
Figure 3E:
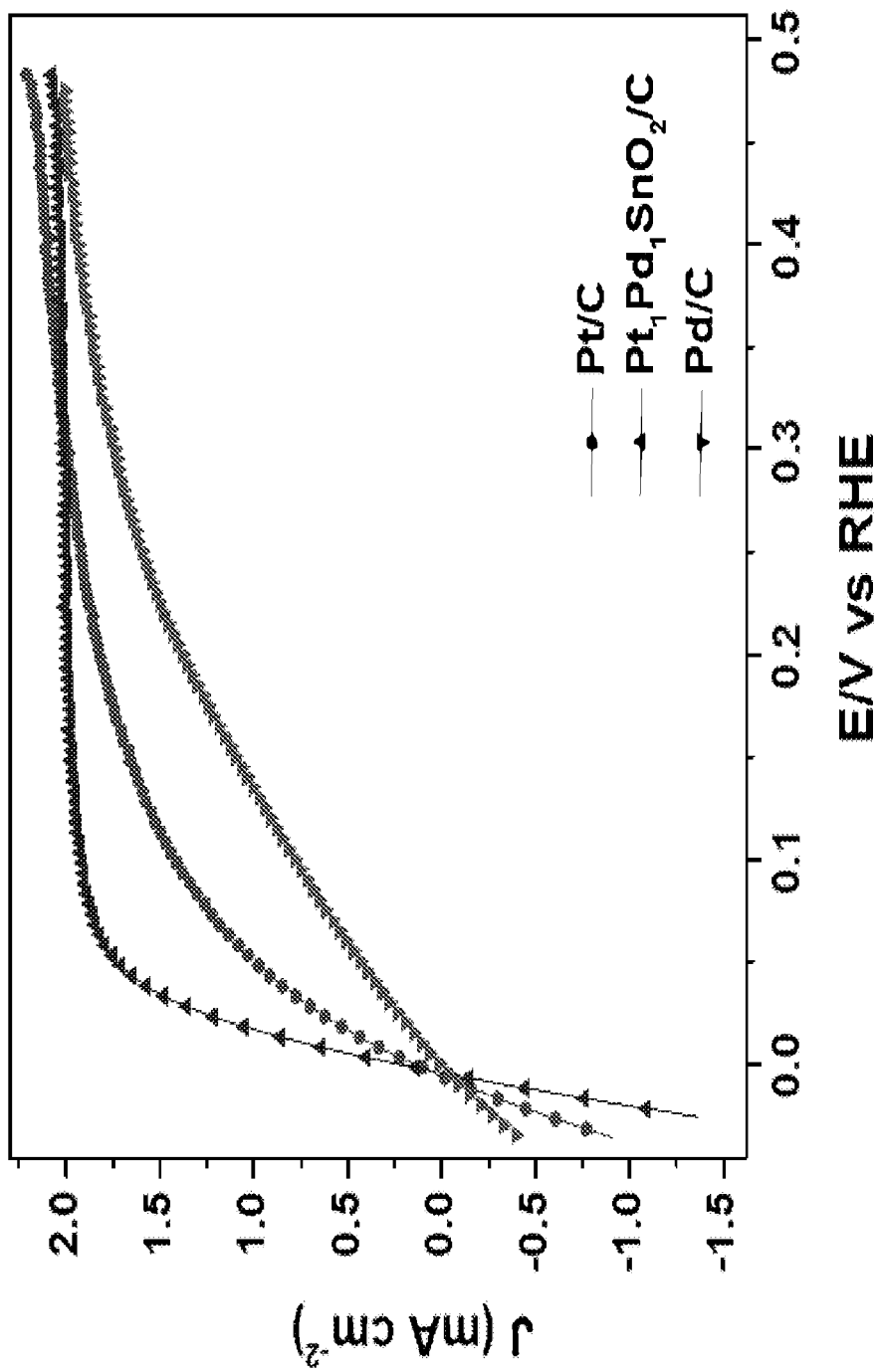
Figure 3F:
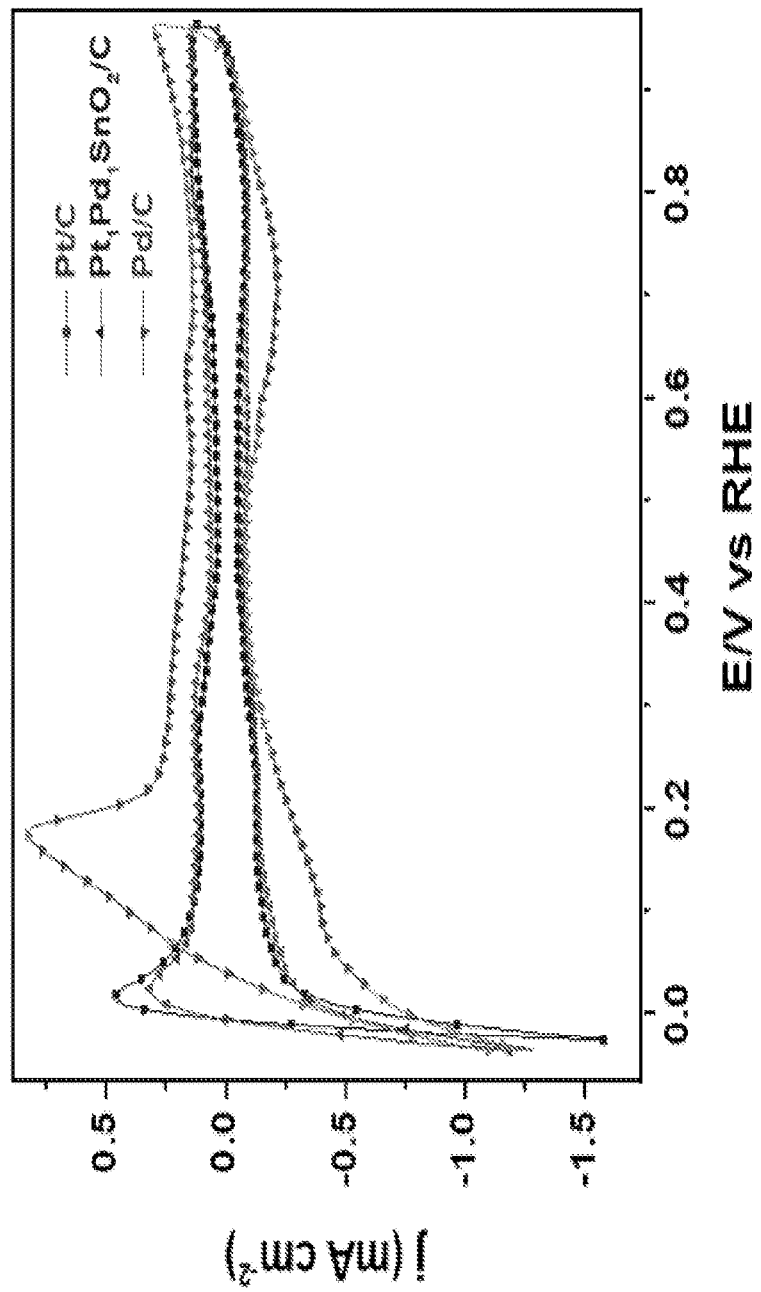
Figure 3G:
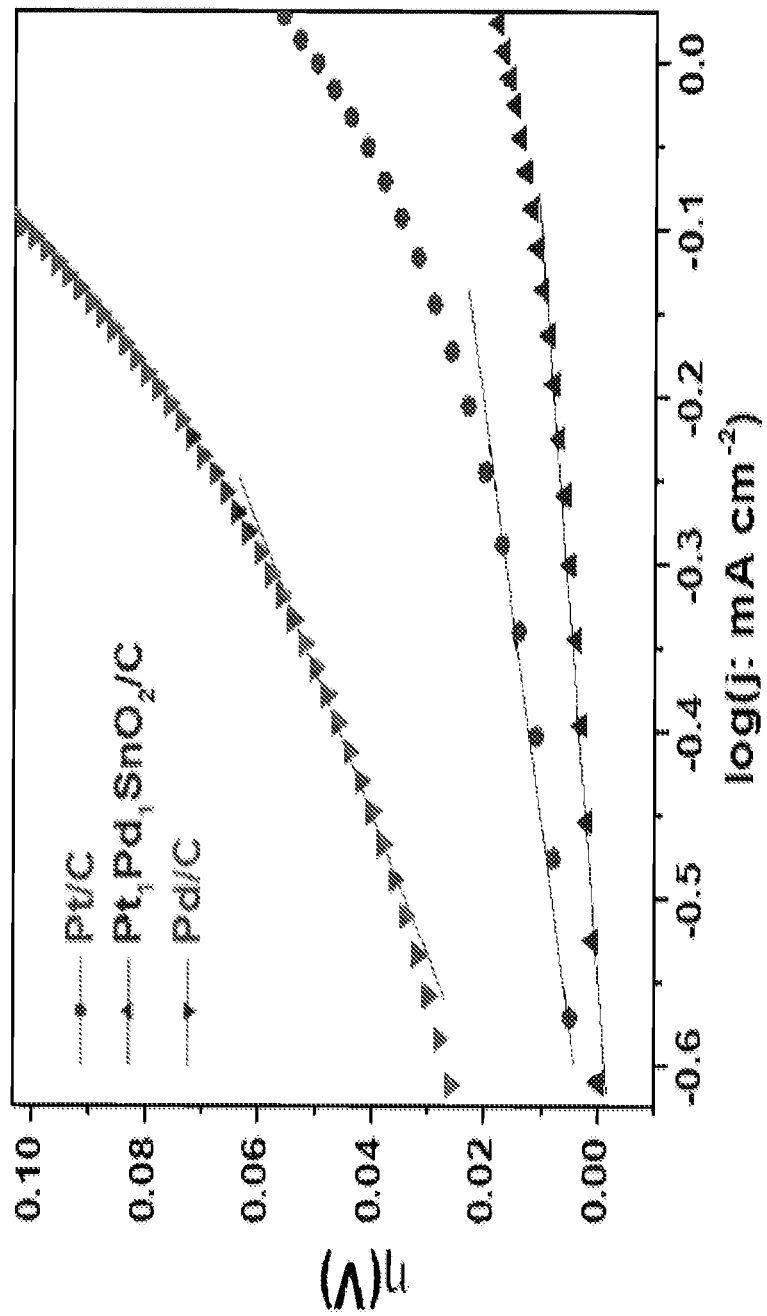

In additional exemplary procedures for optimizing the fuel cell using PdSn-based catalysts, and to further improve the kinetics on the HOR, a small amount of Pt was added in Pd—Sn catalysts (FIGS. 3E and F). The amount of Pt and Pd was optimized in the catalyst layer to achieve the best performance. The optimized composition ($P_{t1}Pd_1SnO_2$) exhibited a very low Tafel slope of 21.2 mV/decade which was 2 and 5.5 times lower than Pt and Pd, respectively, pointing towards very facile HOR kinetics in alkaline solution (see FIG. 3G and Table 4).

TABLE 4

| Catalysts | j @50 mV (mA cm$_{ECSA}^{-2}$) | j @100 mV (mA cm$_{ECSA}^{-2}$) | j @150 mV (mA cm$_{ECSA}^{-2}$) | Tafel slope (mV/decade) |
|---|---|---|---|---|
| Pt/C | 0.082 | 0.156 | 0.195 | 42.4 |
| Pd/C | 0.010 | 0.026 | 0.040 | 118.0 |
| Pt$_1$Pd$_1$SnO$_2$/C | 0.13 | 0.19 | 0.20 | 21.2 |

Figure 4A:
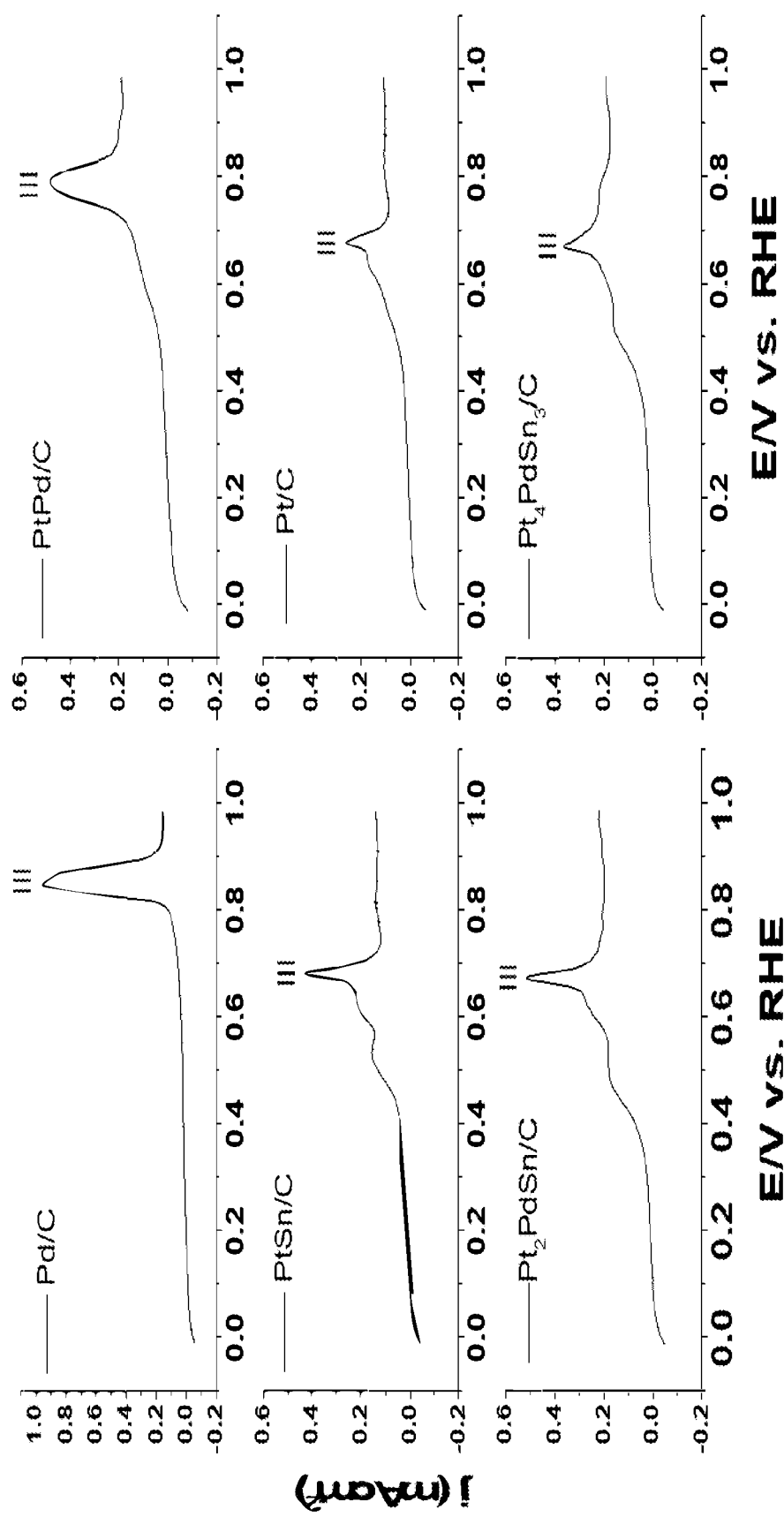
FIGS. 4A-4B present CO-stripping LSVS of Pt/C (FIG. 4A middle right panel), Pd/C (upper left panel), $Pt_4Sn_3Pd/C$ (FIG. 4A lower right panel), $Pt_2SnPd/C$ (FIG. 4A lower left panel), PtPd/C (FIG. 4A upper right panel), PtSn/C middle left panel), and Pd/C (FIG. 4A upper left panel) and superimposition of CO-stripping voltammograms of Pt/C, $Pt_1Pd_1SnO_2/C$, and Pd/C (FIG. 4B) recorded in $N_2$-saturated 0.1 M NaOH solution. The CO is adsorbed on the catalysts surface on CO saturated solution by applying 50 mV potential for 600 s and then the solution is saturated with $N_2$ for 600 s and a CV is recorded for a scan rate of 20 mV $s^{-1}$.
Figure 4B:
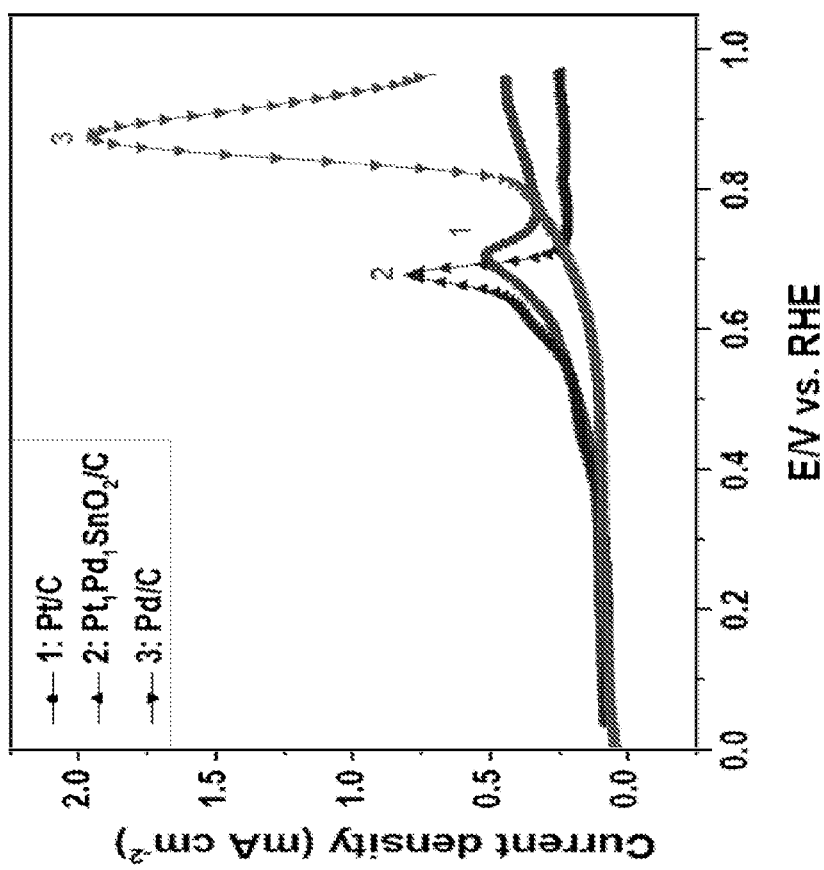

The CO-stripping experiments were performed in order to probe the descriptors of HOR on these catalysts (FIG. 4A). The CO-stripping voltammogram of Pt$_1$Pd$_1$SnO$_2$/C is shown in FIG. 4B. For comparison, the data of Pt/C, and Pd/C is also included in the same figure. The CO stripping peaks potential of PtPd$_1$SnO$_2$/C is at 0.690 V which is 0.028 and 0.19 V lower than Pt/C and Pd/C, respectively. The lower onset potential of the CO stripping is related to the formation of OH$_{ad}$ at a lower potential which facilitates the Volmer step and therefore improves the kinetics of overall reaction by providing more oxophilic effect (Sn).

The multiple peaks were observed in the CO-strippings of all the catalyst except Pd/C. The similar multiple CO-stripping peaks were reported on Pt. The charge of 420 µCcm$^{-2}$ was used for the calculation of ECSA from CO-stripping because it is a 2e$^-$ process. The ECSA results were in good agreement with each other and without being bound by any particular theory, slightly higher ECSA is observed from the CO-stripping may be due to the background correction. The shift in the CO-stripping onset potential to the lower value is attributed to the oxophilic behavior from the second metal. The CO-stripping parameters were estimated and are given in Table 5A, showing the summary of the CO-stripping parameter estimated on Pt/C, Pd/C, Pt$_4$Sn$_3$Pd/C, Pt$_2$SnPd/C, PtPd/C, PdSn/C, and Pd/C. The lowest CO-stripping onset potential observed with Pt$_4$Sn$_3$Pd/C is attributed, without being bound by any particular mechanism, to the oxophilic natures of Sn.

TABLE 5A

| Catalysts | ECSA $(m^2\,g^{-1})$ from CO-striping | Co-stripping onset potential (mV) | Peak (III) potential (mV) |
|---|---|---|---|
| Pd/C | 63.0 | 619 | 850 |
| Pt/C | 51.1 | 341 | 677 |

TABLE 5A-continued

| Catalysts | ECSA $(m^2\,g^{-1})$ from CO-striping | Co-stripping onset potential (mV) | Peak (III) potential (mV) |
|---|---|---|---|
| *PtPd/C | 55.0 | 410 | 792 |
| PtSn/C | 52.4 | 310 | 682 |
| *Pt$_4$Sn$_3$Pd/C | 46.2 | 284 | 673 |
| *Pt$_2$SnPd/C | 58.7 | 288 | 673 |

*Loading of Pt and Pd taken for ECSA calculation

Further ECSA results, estimated from both CO-stripping and hydrogen desorption (H$_{des}$) charge are given in Table 5B. The CO stripping onset potential of Pt$_1$Pd$_1$SnO$_2$ is at 0.690 V which is 0.030 V lower than Pt and (Table 5B).

TABLE 5B

| Catalysts | ECSA $(m^2\,g^{-1}_{pt})$ from CO-striping | ECSA $(m^2\,g^{-1}_{pt})$ from Hdes charge |
|---|---|---|
| Pt/C | 60.0 | 80.5 |
| Pt$_1$Pd$_1$SnO$_2$/C* | 48.2 | 63.0 |
| Pd/C | 179.0 | 198.0 |

*Loading of Pt and Pd taken together for surface area calculation from H$_{des}$ and CO-stripping charges Example 4

Hydrogen Oxidation Reaction Activity of Various Palladium Based Catalysts

Preparation Methods

Electrodeposition Followed by Galvanic Displacement:

In exemplary procedures, Pd/Ni—W on Torey carbon were prepared by electrodepositing Ni and W together. Thereafter, Pd was added by galvanic displacement reaction.

In another exemplary procedure, Pd/Ni—Mo catalysts on Torey carbon was prepared by electrodepositing Ni and Mo together. Thereafter, Pd was added by galvanic displacement reaction.

In another exemplary procedure, Pd—Sn on Torey carbon was prepared by electrodepositing Pd and Sn together.

Galvanic Displacement on Commercial Nanoparticles:

In exemplary procedures, Pd—Co catalyst was prepared by following procedure: commercial Co nanoparticles were stirred in warm (60° C.) NaOH solution for 10 min, then cooled to room temperature and further Pd electroless solution was introduced for galvanic displacement. Thereafter, particles were mixed with carbon for slurry making.

In another exemplary procedure, Pd—Cr catalyst was prepared by following procedure: commercial Cr nanoparticles were stirred in HF acid for 10 min, and then Pd electroless solution was introduced for galvanic displacement. Thereafter, particles were mixed with carbon for slurry making.

All of the experiments were done as a screening test to find out the active materials and so only best performed Pd—Sn catalytic systems were tested in XRD, ICP, etc.

Figure 5:
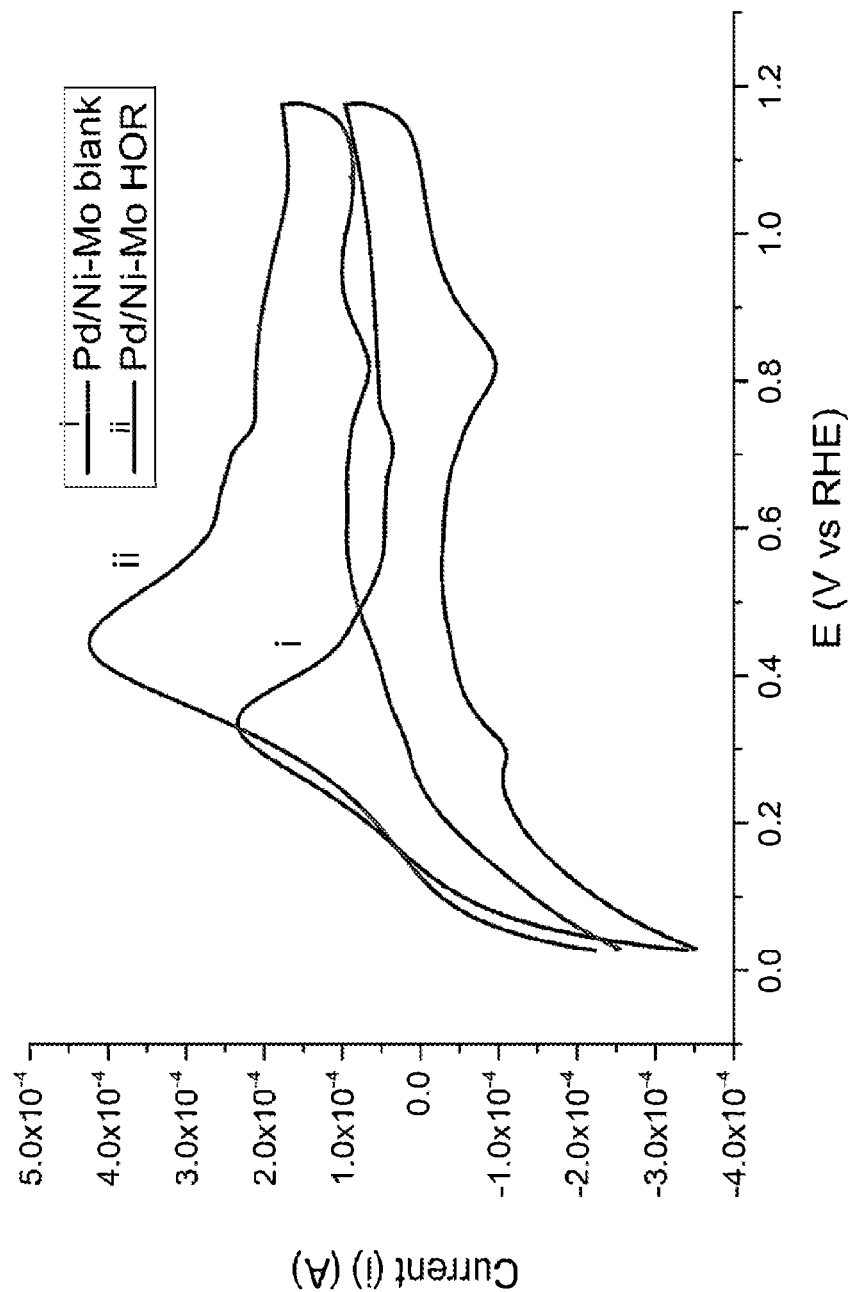
FIG. 5 presents an overlaid CV of Pd/Ni—Mo catalysts recorded in $N_2$ and $H_2$ saturated 0.1 M NaOH electrolyte; Scan rate—50 mV/s; "-" denotes alloyed metals, and "x/y" denotes a coated material, in which x coating y.
Figure 6:
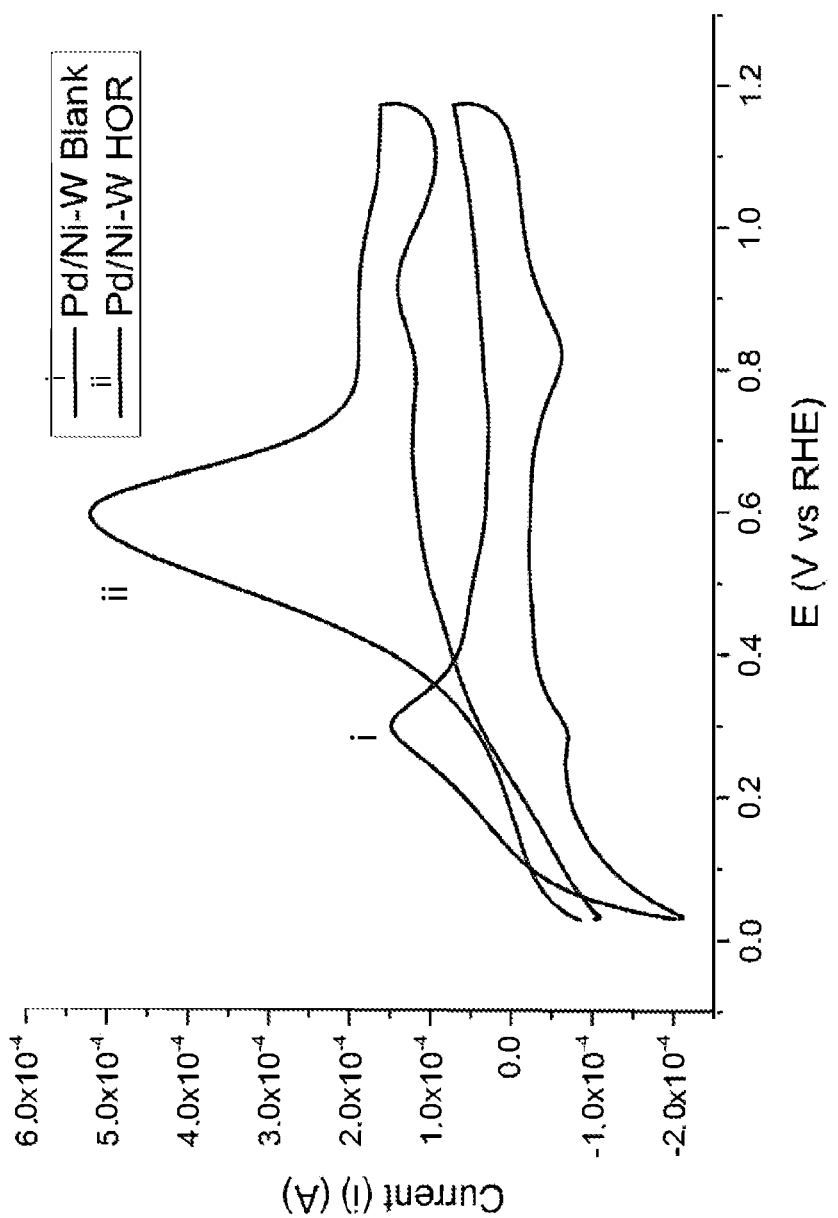
FIG. 6 presents an overlaid CV of Pd/Ni—W catalysts recorded in $N_2$ and $H_2$ saturated 0.1 M NaOH electrolyte; Scan rate 50 mV/s.

Hydrogen Oxidation Reaction (HOR) Activity of Pd on Pre-Electrodeposited Ni—Mo and Ni—W Film:

Pd overlayers electrodeposited onto pre-electrodeposited Ni—Mo and Ni—W films on Au disk electrode were made to study the influence of nickel based films on the HOR activity in alkaline solution. It could be noticed from the presented cyclic voltammograms (FIGS. 5 and 6) that both these films catalytically oxidize hydrogen, however with significant overpotential (≥300 mV). Therefore, these catalyst systems were not studied further due to its sluggish HOR kinetics.

Figure 7:
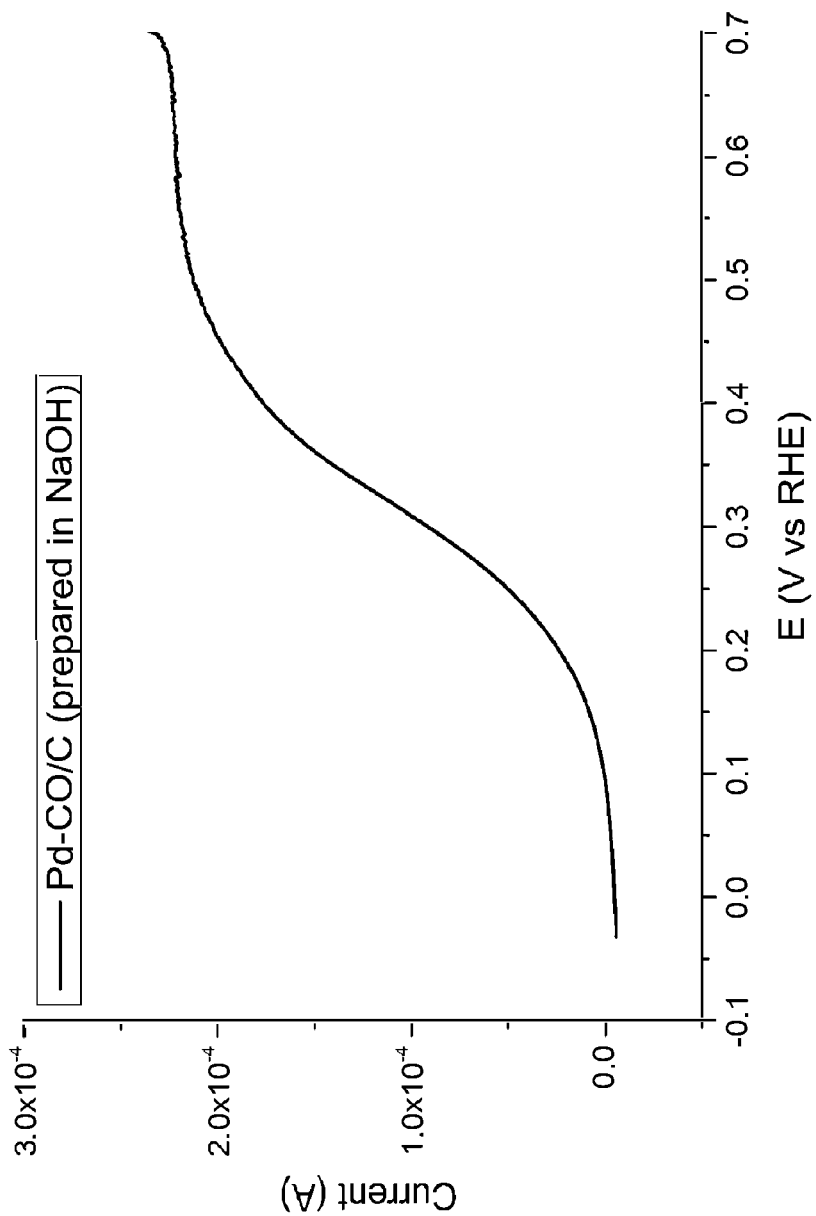
FIG. 7 presents a LSV of Pd—Co catalysts recorded in $N_2$ and $H_2$ saturated 0.1 M NaOH electrolyte; Scan rate 5 mV/s.
Figure 8:
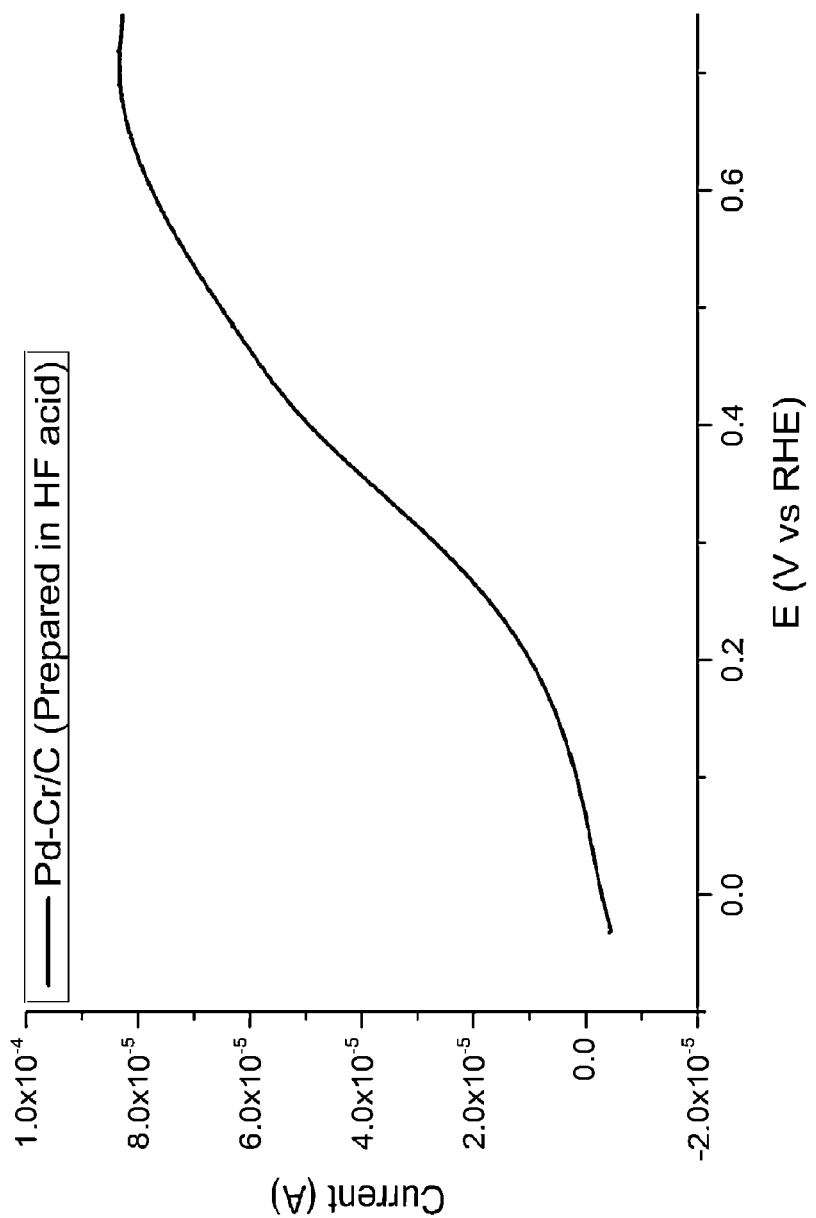
FIG. 8 presents a LSV of Pd—Cr catalysts recorded in $N_2$ and $H_2$ saturated 0.1 M NaOH electrolyte; Scan rate 5 mV/s.

HOR Activity of Pd—Co and Pd—Cr Catalysts:

Co nanoparticle and Cr nanoparticles, following the removal of their oxide layer by suitable etching agent, were subjected to electroless reaction with acidic $PdCl_2$ solution to form Pd coated Co or Cr nanoparticles, respectively. Pd concentration, oxide etching duration and electroless reaction time, as well as pH conditions were studied to achieve the formation of optimum catalysts. The electrochemical HOR activity of the optimal Pd—Co and Pd—Cr is shown in FIG. 7 and FIG. 8, respectively. Both these catalysts were seen to catalyze HOR at relatively low overpotential (≤200 mV). This is still prohibitively high to be used as anode catalysts in anion exchange membrane single fuel cell studies.

Figure 11:
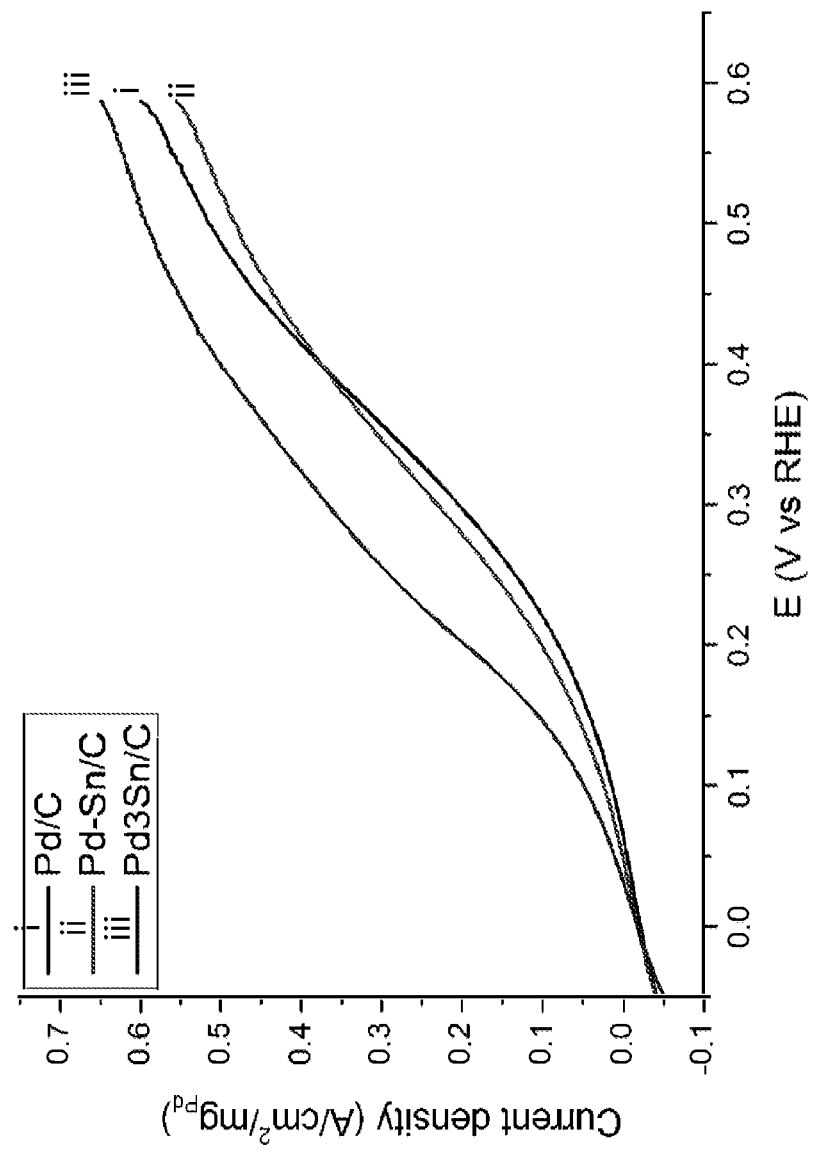
FIG. 11 presents an overlaid LSV of Pd—Sn based bimetallic catalyst particles recorded in $N_2$ and $H_2$ saturated 0.1 M NaOH electrolyte; Scan rate 5 mV/s.

HOR Activity of Pd—Sn, Pd—Sn/Sn, Pd—Sn/C Catalysts:

Up to now, Pd—Sn systems have not been explored as catalysts for HOR in alkaline solutions. Therefore, the catalytic activity of Pd and Sn based family was examined (i) to evaluate the HOR activity and (ii) to study the role of tin/tin oxide and different alloy phases on the HOR activity.

pared under identical conditions. To further probe the role of Sn, PdSn/C and $Pd_3Sn/C$ were prepared and electrochemically tested. FIG. 11 shows that $Pd_3Sn/C$ catalyzes hydrogen at a very low onset potential of ~30 mV with a specific current density value of 0.5 A/cm$^2$ at 0.6 V. It is discerned that Sn as an alloy exerts a positive influence on the electrocatalytic behavior of Pd and these systems are promising.

Taken together, the half wave potential of HOR in the order of $Pt_4Sn_3Pd/C$>$Pt_2SnPd/C$>PtSn/C>PtPd/C~Pt/C>Pd/C. The Pd/C exhibits lowest HOR activity with an onset potential of 109 mV. On the other hand, $Pt_4Sn_3Pd/C$ shows the lowest HOR half-wave potential of 43 mV along with 0.0 mV HOR onset potential. The electrochemical surface area was estimated from both $H_{des}$ and CO-stripping charge and they are in good agreement. The lowest CO-stripping onset potential of 284 mV was observed on $Pt_4Sn_3Pd/C$, suggesting the oxophilic nature of Sn. The peak power density of ~64.0 mW cm$^{-2}$mg$^{-1}$ was obtained with an anode made of $Pt_4Sn_3Pd/C$ catalysts. Without being bound by any particular mechanism, it is assumed that the higher activity of $Pt_4Sn_3Pd/C$ was attributed to the synergy between Pt, Pd, and Sn present in the catalysts.

Optimization of MEA Fabrication Procedure:

The anion exchange membrane was found to be stable up to 70° C. under humidified conditions. Electrocatalyst layers were coated directly onto membranes and thickness of these layers were studied to understand the factors governing cell performance at low temperatures. Hot pressing membrane electrode assembly was also found to improve the power density of single fuel cells.

Table 6 presents comparison of HOR activity of screened Pd-M catalysts.

TABLE 6

| Catalyst | Onset Potential (mV) | Specific Current Density at 100 mV (mA cm$^{-2}$ mg$^{-1}$ of PGM) | Specific Current Density at 200 mV (mA cm$^{-2}$ mg$^{-1}$ of PGM) | Specific Current Density at 500 mV (mA cm$^{-2}$ mg$^{-1}$ of PGM) |
|---|---|---|---|---|
| Pd/Ni—Mo | 100 | No HOR current | 10 (without rotation) | 55 (without rotation) |
| Pd/Ni—W | 180 | No HOR current | 8 (without rotation) | 60 (without rotation) |
| PdCo | 150 | | | |
| PdCr | 106 | | | |
| PdSn/Sn/C | 30 | 52 | 85 | 505 |
| $Pd_3Sn/Sn/C$ | 20 | 100 | 175 | 990 |
| $Pd_3Sn_4/Sn/C$ | 30 | 75 | 120 | 502 |
| PdSn/C | 85 | 10 | 110 | 453 |
| $Pd_3Sn/C$ | 70 | 25 | 155 | 240 |
| Electrodeposited PdSn* | 80 | 2 | 8 | 80 |
| Pd/C (Control) | 95 | 0.15 | 75 | 600 |

*Measured on stationary electrode while other catalysts were measured on a rotating disk electrode (50 microgram cm$^{-2}$ and 1000 RPM)

Figure 9:
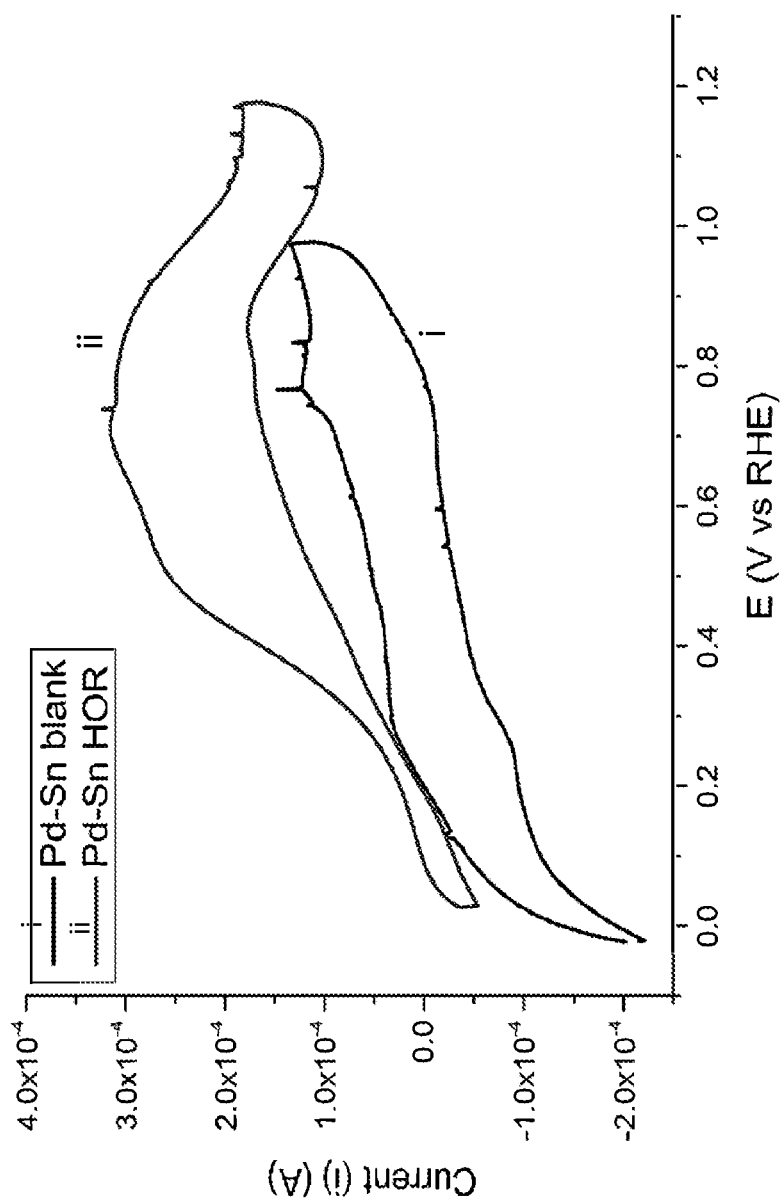
FIG. 9 presents an overlaid CV of co-electrodeposited Pd—Sn catalysts recorded in $N_2$ and $H_2$ saturated 0.1 M NaOH electrolyte; Scan rate: 50 mV/s.

FIG. 9 shows the HOR activity of Pd—Sn alloys films electrodeposited on carbon substrates. These catalysts films were found to exhibit impressive activity towards HOR with an overpotential of ≤70 mV. However, for practical purpose, the loading of the catalysts had to be increased to attain high power density in single fuel cells. It is difficult to achieve high loading catalytic Pd—Sn particles using electrodeposition procedure and hence it was decided to make nanoparticles in bulk using wet-chemical approach.

Figure 10:
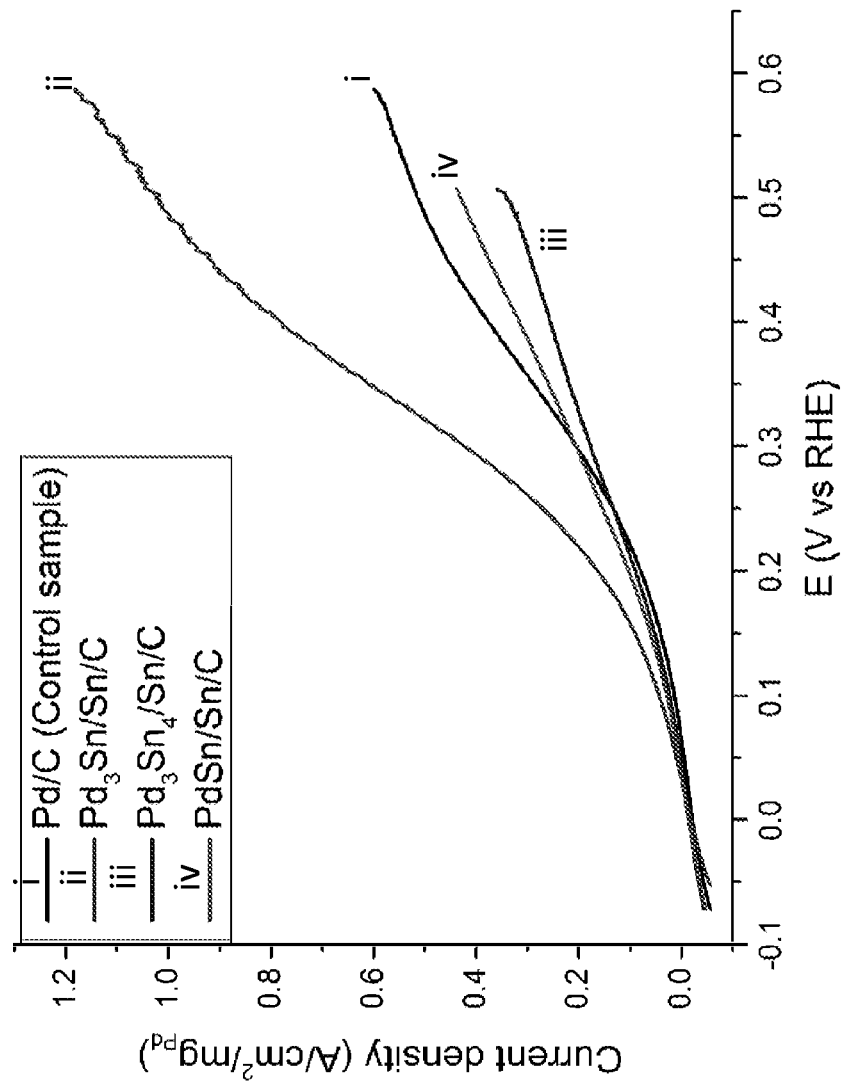
FIG. 10 presents an overlaid LSV of Pd—Sn/Sn based catalysts recorded in $N_2$ and $H_2$ saturated 0.1 M NaOH electrolyte; Scan rate: 5 mV/s.

The HOR activity of different carbon supported and unsupported PdSn/Sn catalysts is presented in FIG. 10. $Pd_3Sn/Sn/C$ displays the best activity among the tested alloy phases. The onset potential of ~20 mV at which HOR was noticed is perhaps better than the Pd/C nanoparticles pre- Example 5

Hydrogen Oxidation Reaction Activity of Platinum/Palladium/Tin Based Catalysts

Figure 12:
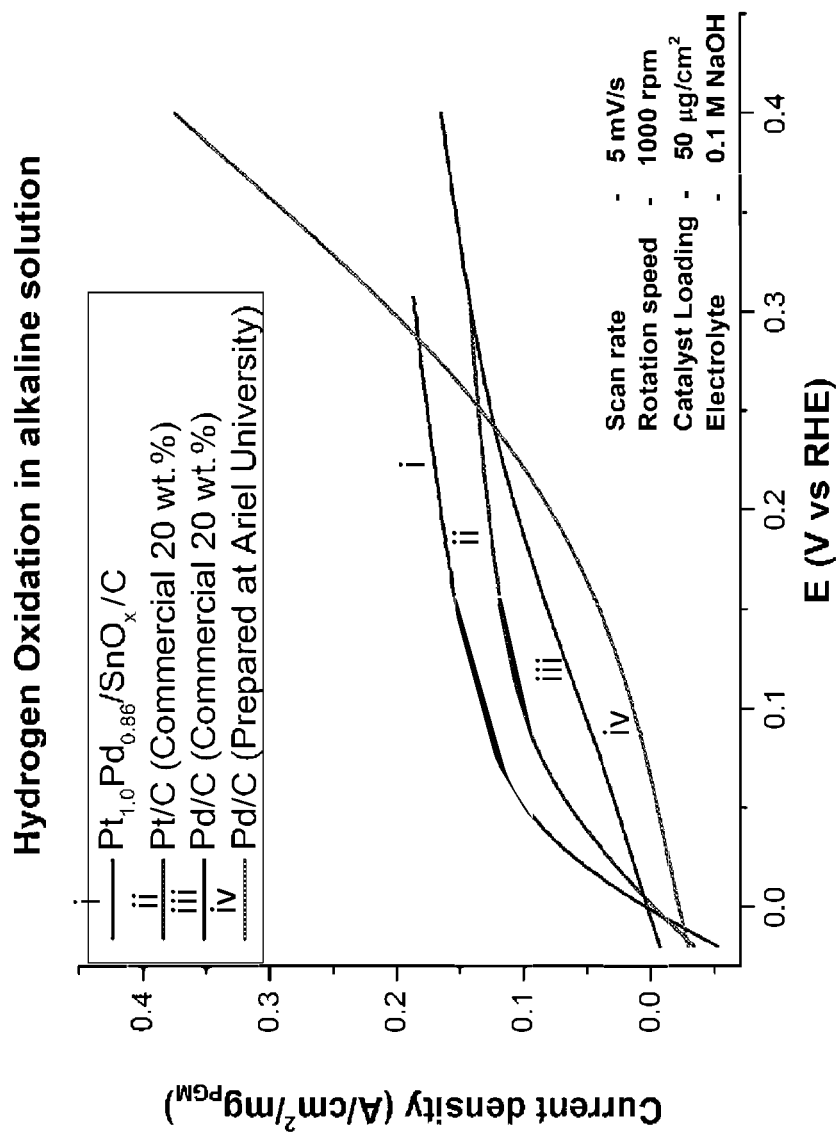
FIG. 12 presents a LSV of selected platinum group metal (PGM) catalysts in hydrogen saturated alkaline solution. Scan rate: 5 mV/s; Rotation speed: 1000 rpm; Catalyst Loading: 50 μg/$cm^2$; Electrolyte: 0.1M NaOH.

Used as an anode catalyst in hydrogen alkaline fuel cells, PtPd supported on $SnO_x$ particle supported on a high surface area carbon support (e.g. Vulcan XR72) was further examined. The subscript "$x$" refers to the tin being in several oxidation states e.g. Sn, SnO and $SnO_2$ with an unknown composition. FIG. 12 compares hydrogen oxidation specific activity in alkaline electrolyte solution using rotating disk electrode (RDE). This Figure shows that the PtPd/SnO had a lower onset potential (low over-potential, lower reaction resistance (dE/dI)) and reached limiting diffusion currents at after 60 mV compare with 100 mV and 200 mV of commercial Pd/C and Pt/C, respectively.

Figure 13A:
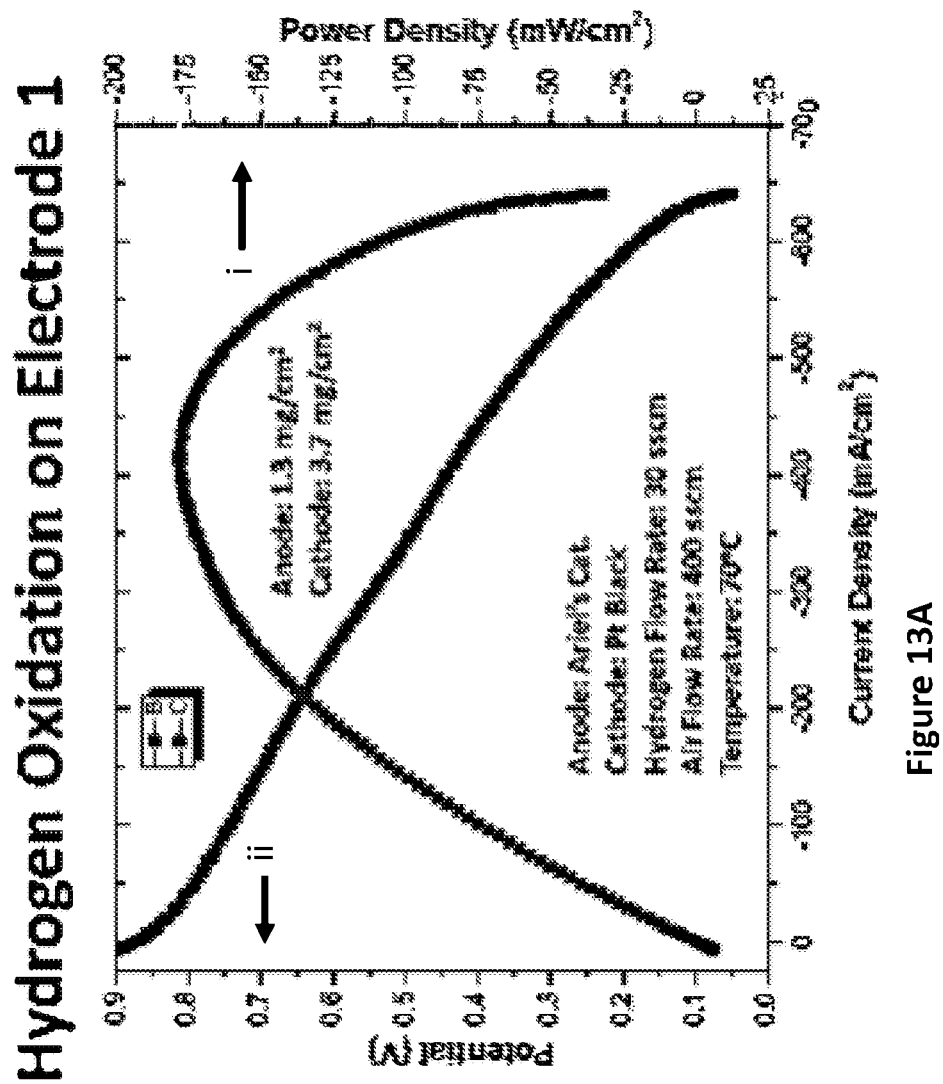
FIGS. 13A-13B present the $PtPdSnO_x/C$ catalyst performance in a proton exchange membrane fuel cells (PEMFC) using $H_2$ (FIG. 13A) and dimethyl ether (DME) (FIG. 13B); curve (i) is power output curve, and curve (ii) is the current discharge curve; parameters in FIG. 13A: anode: the disclosed catalyst, 1.3 mg/$cm^2$, cathode: 3.7 mg/$cm^2$, Pt black; hydrogen flow rate: 30 sscm, air flow rate: 400 sscm, temperature: 70° C.; parameters in FIG. 13B: anode: the catalyst, 1.3 mg/$cm^2$, cathode: 3.7 mg/$cm^2$, Pt black; DME flow rate: 40 sscm, air flow rate: 400 sscm, temperature: 70° C.; sscm: standard cubic centimeters per minute.
Figure 13B:
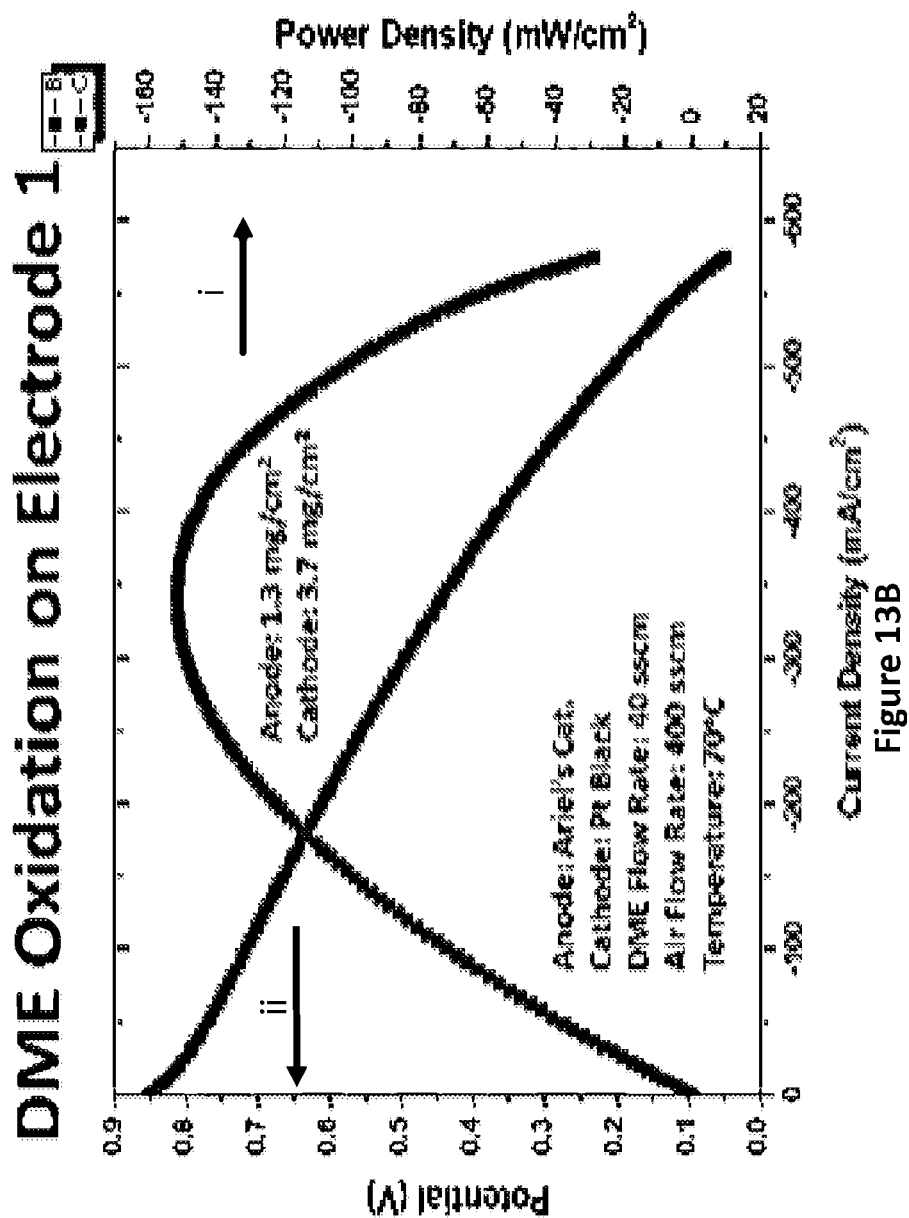

Using Tin Oxide on a High Surface Area Carbon:

A mixed tin oxide support for the Platinum group metal (PGM) catalysts (Pt, Pd and their mixing (alloy or intermetallic interactions) with Sn was investigated. The innovation in dimethyl ether (DME) oxidation catalysts may be related to the dispersion of nanometeric size $Sn/SnO/SnO_2$ ("$SnO_x$") particles on high surface area carbon support prior to addition of the Pt, Pd complexes. Thus, the nano-Sn, settled on the carbon, performed as a reducing agent of the complexes to yield thin coatings on these $SnO_x$ (all is one pot synthesis). These catalysts were incorporated into the anode of a DME in a direct Gas feed fuel cells. The outstanding performance of these catalysts is shown in hydrogen and in DME fueled proton exchange membrane fuel cells (PEMFC) in FIGS. 13A-B.

These results demonstrate the high activity of the $PtPdSnO_x/C$ catalyst. It also shows some activity in hydrogen that can harassed when using this catalyst with carbon monoxide contaminated fuel (hydro carbon reforming).

Figure 14:
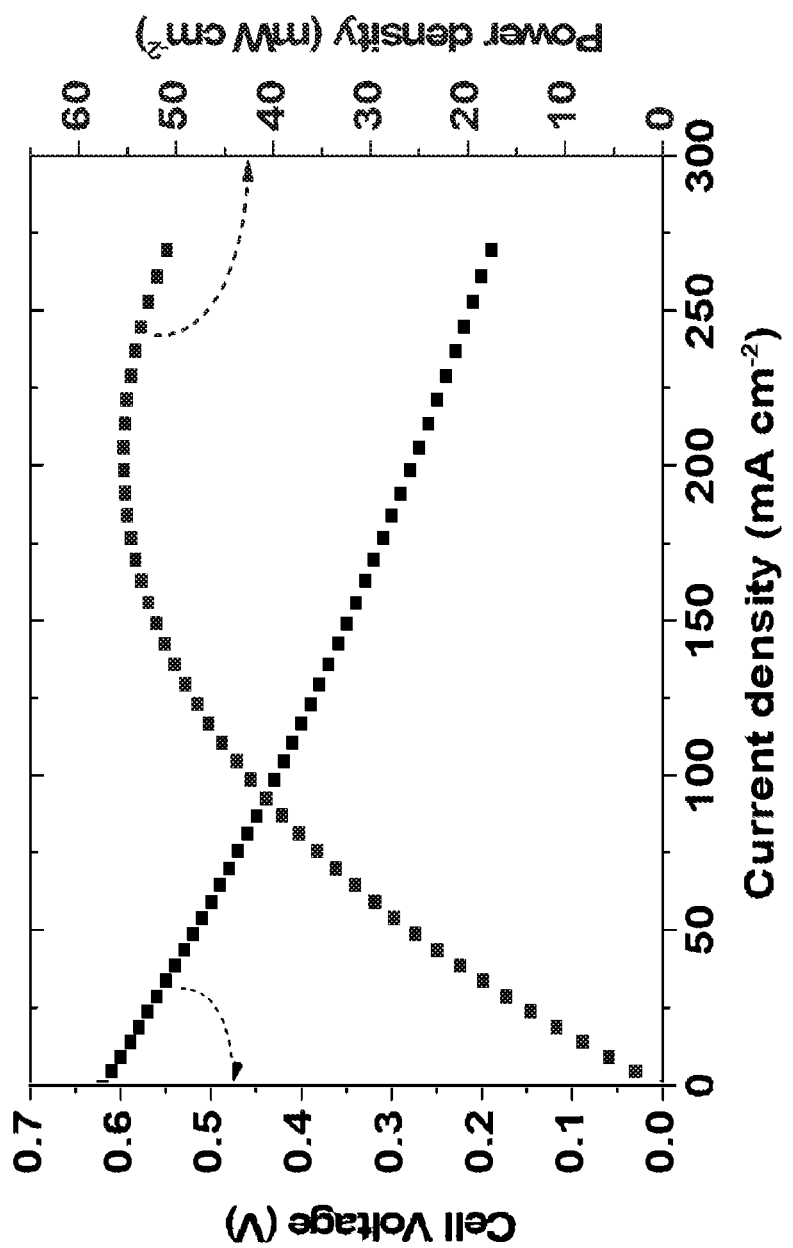
FIG. 14 presents a graph showing the anion exchnage membrane fuel cell (AEMFC) perfromance of $Pt_4Sn_3Pd/C$ as an anode and Pd/C (20 wt %) as a cathode and using a-QAPS-$S_8$ membrane. The humidified $H_2$ and $O_2$ flow rates are 30 and 100 sccm, fed at anode and cathode, respectively. The cell temperature: 50° C., relative humidity (RH): 100%, and no back pressure.

Fuel Cell Performance:

The fuel cell performance was evaluated on the optimized catalysts $Pt_4PSn_3Pd/C$ as an anode and commercial Pd/C (20 wt %) at the cathode, respectively (FIG. 14). The cathode used was Pd/C because of the feasible oxygen reduction kinetics in alkaline electrolyte. The peak power density of 55.4 mW $cm^{-2}$ was observed at 0.3 V. The open circuit potential of the cell was 0.62 V which is lower, maybe because of the poor mechanical stability of the a QAPS-S8 membrane.

Example 6

Ternary Catalyst ($Pt_3Pd_3Sn_2$) Synthesized by Polyol Method

Synthesis of Carbon Supported Catalyst:

An appropriate amount of palladium chloride and potassium tetrachloroplatinate was dissolved in ethylene glycol and water solution (9:1) in ultrasonic bath. In order to enhance the solubility of palladium chloride a small amount of lithium chloride (0.01 M) was also added to the solution. The resultant solution was stirred for one hour and subsequently tin chloride was added. The resultant dark brown solution was further stirred for one hour and finally the pH of the solution was adjusted above 12 aqueous solution of sodium hydroxide. The resultant solution was slowly heated in oil bath up to 100° C. than temperature was raised to 200° C. and solution was refluxed for two hours. Finally, appropriate amount (30% by weight) of Vulcan Carbon (XC72R, Cabot Corp.) was added to the solution. The resultant dark black precipitate was washed several times with water and acetone and finally dried under vacuum for 4 hours.

Synthesis of Carbon Supported Catalyst:

An appropriate of palladium chloride and potassium tetrachloroplatinate was dissolved in ethylene glycol and water solution (9:1) in ultrasonic bath. In order to enhance the solubility of palladium chloride a small amount of lithium chloride (0.01 M) was also added to the solution. The resultant solution was stirred for one hour and subsequently tin chloride was added. The resultant dark brown solution was further stirred for one hour and finally the pH of the solution was adjusted above 12 aqueous solution of sodium hydroxide. Next, the resultant solution was slowly heated in oil bath up to 100° C. than temperature was raised to 200° C. and solution was refluxed for two hours. Finally, an appropriate amount (30% by weight) of Vulcan Carbon (XC72R, Cabot Corp.) was added to the solution. The resultant dark black precipitate was washed several times with water and acetone and finally dried under vacuum for 4 hours.

Physical Characterizations:

X-ray diffraction (XRD) patterns were recorded on an x-ray diffractometer (Rigaku Smartlab) using Cu Kα radiation (λ=1.54 Å) to determine the crystal structure of the catalyst. The morphology and crystallinity of nanoparticles were analyzed by transmission electron microscopy (TEM; JEOL 2100) with the microscope operated at 200 kV. The elemental composition was analyzed by inductive coupled plasma-optical emission spectroscopy (Varian ICP-OES 720) and energy dispersive X-ray analysis (Oxford Instruments). The oxidation states and bonding energies between Pt, Pd, Sn and O were determined by X-ray photoelectron spectroscopy (Kratos Analytical Axis HS XPS spectrometer).

Figure 15:
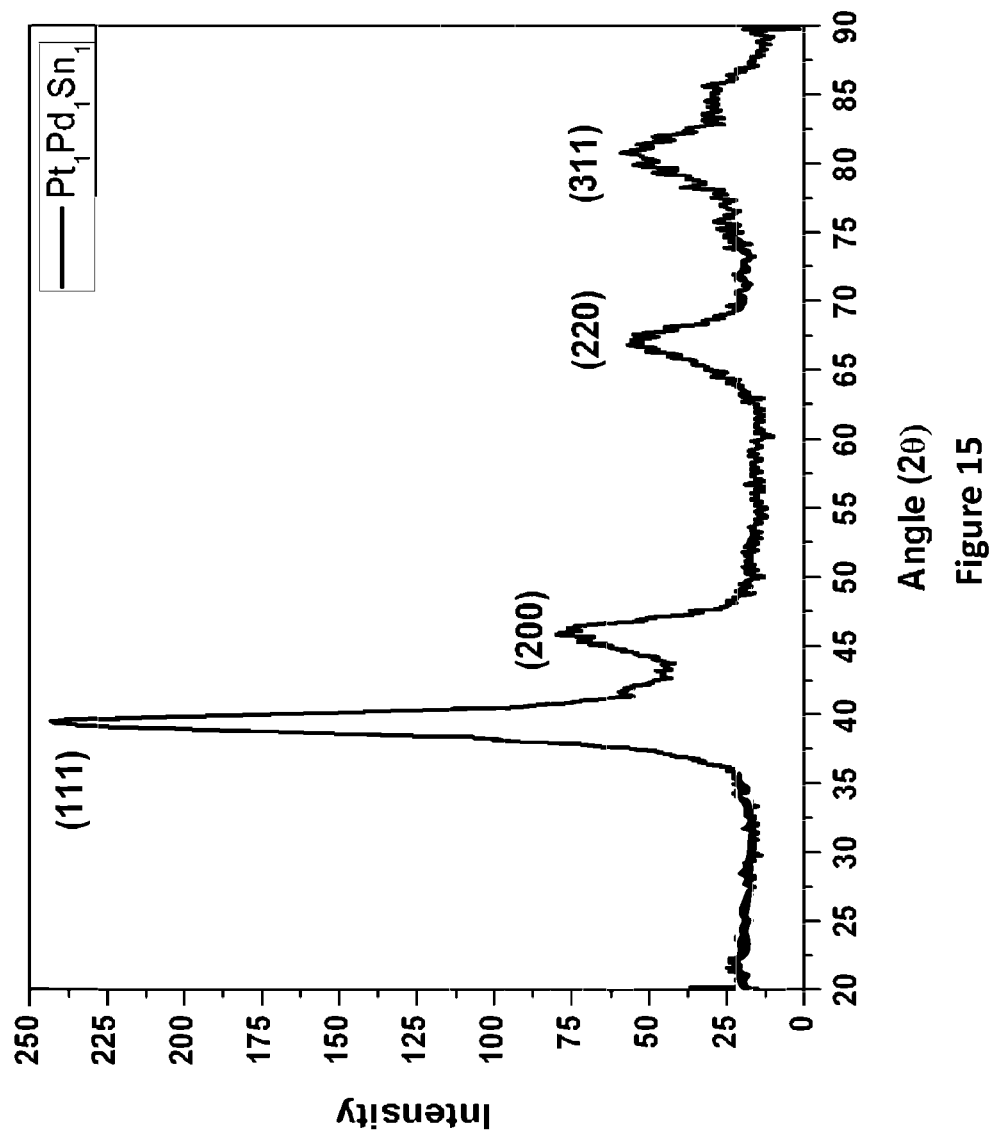
FIG. 15 presents a graph showing the XRD patterns of $Pt_3Pd_3Sn_2$ catalyst.

The diffraction pattern of $Pt_3Pd_3Sn_2$ is presented in FIG. 15. The XRD pattern shows the characteristic peaks of the face-centered cubic (fcc) crystalline Pt. There are faint peaks at 39.80° and 46.30 which correspond to the Pt (111) and (200) crystal faces. The diffraction pattern shows the cubic phase. These diffraction peaks are shifted to lower 2θ values with respect to the corresponding peaks in the pure Pt catalyst. It has been observed that the Pt/Pd forms nearly all possible alloys with Sn and the shift of the peaks to lower angles should reveal the formation of a solid solution, due to the incorporation of Sn in the fcc structure of Pt/Pd. No peaks of metallic oxides of Pd, Pd or Sn were detected in the $Pt_3Pd_3Sn_2$ catalysts. The lattice parameter of $Pt_3Pd_3Sn_2$ was calculated using the (311) peak and it was observed that the lattice parameter was larger than that of pure Pt. The crystallite size of catalyst was calculated from the Scherer's formula was 5-6 nm, which is very close the particle size observed in TEM.

Figure 16A:
FIGS. 16A-16D present high resolution transmission electron microscopy (TEM) images (FIGS. 16A-16C) and selected area electron diffraction (SAED.
Figure 16B:
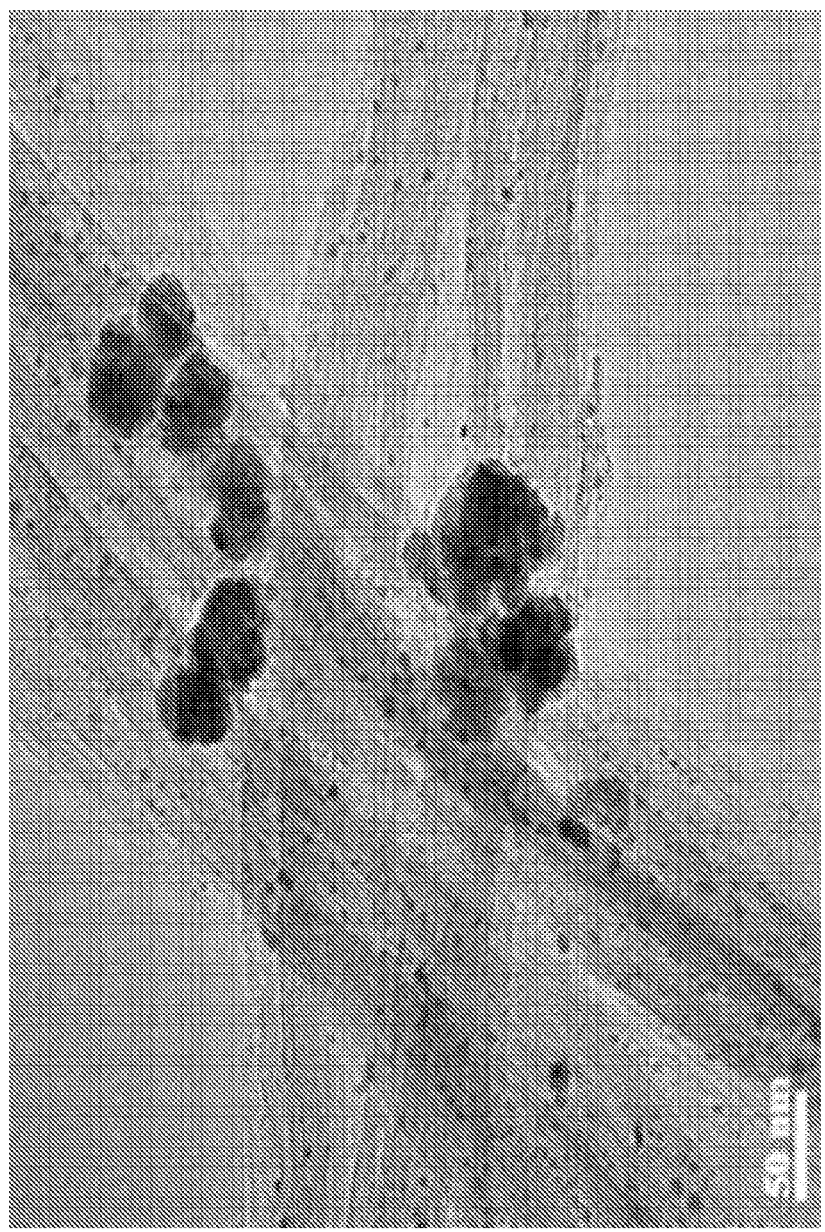
Figure 16C:
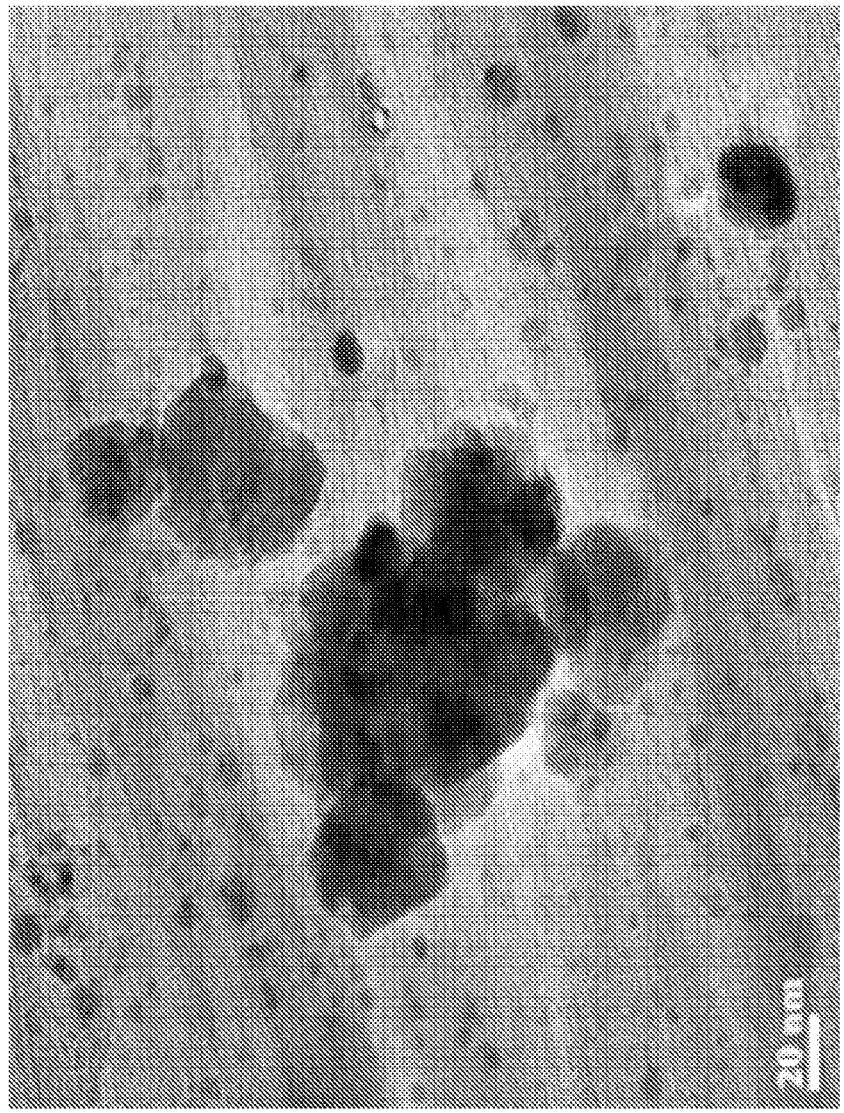
Figure 16D:

High Resolution Transmission Electron Microscopy (HRTEM):

The HRTEM image of $Pt_3Pd_3Sn_2/C$ is presented in FIGS. 16A-B. HRTEM micrographs were obtained with magnifications in the range of 150,000-800,000. The particle size distribution of NCDs was presented by histogram. No free nanoparticles were observed outside the CNTs. The localized energy dispersive spectroscopy (EDX) analysis confirmed the atomic ratio of elements in catalyst was same as precursors (Pt:Pd:Sn=3:3:2).

Electrochemical Studies:

All electrochemical testing was performed in conventional three-electrode electrochemical cell at room temperature using Bio-logic VSP electrochemical workstations. The platinum mesh and Ag/AgCl (3.0 M KCl) was used as counter electrode and reference electrode respectively. The catalyst ink was prepared by dispersing 2.5 mg of $Pt_3Pd_3Sn_2/C$ and 20 μL of Nafion (5% in ethanol) in 1 ml of water and isopropanol (1:1) solution. The working electrode was prepared by drop casting 10 μl of the catalyst ink on glassy carbon electrode (geometrical area=0.196 $cm^2$). All electrochemical testing was performed in supporting electrolyte (0.5 M $H_2SO_4$) containing 1 M fuel (methanol, formic acid, and methyl formate) at room temperature. The supporting electrolyte was purged for half an hour and a blanket of $N_2$ was maintained during the measurements.

Figure 17A:
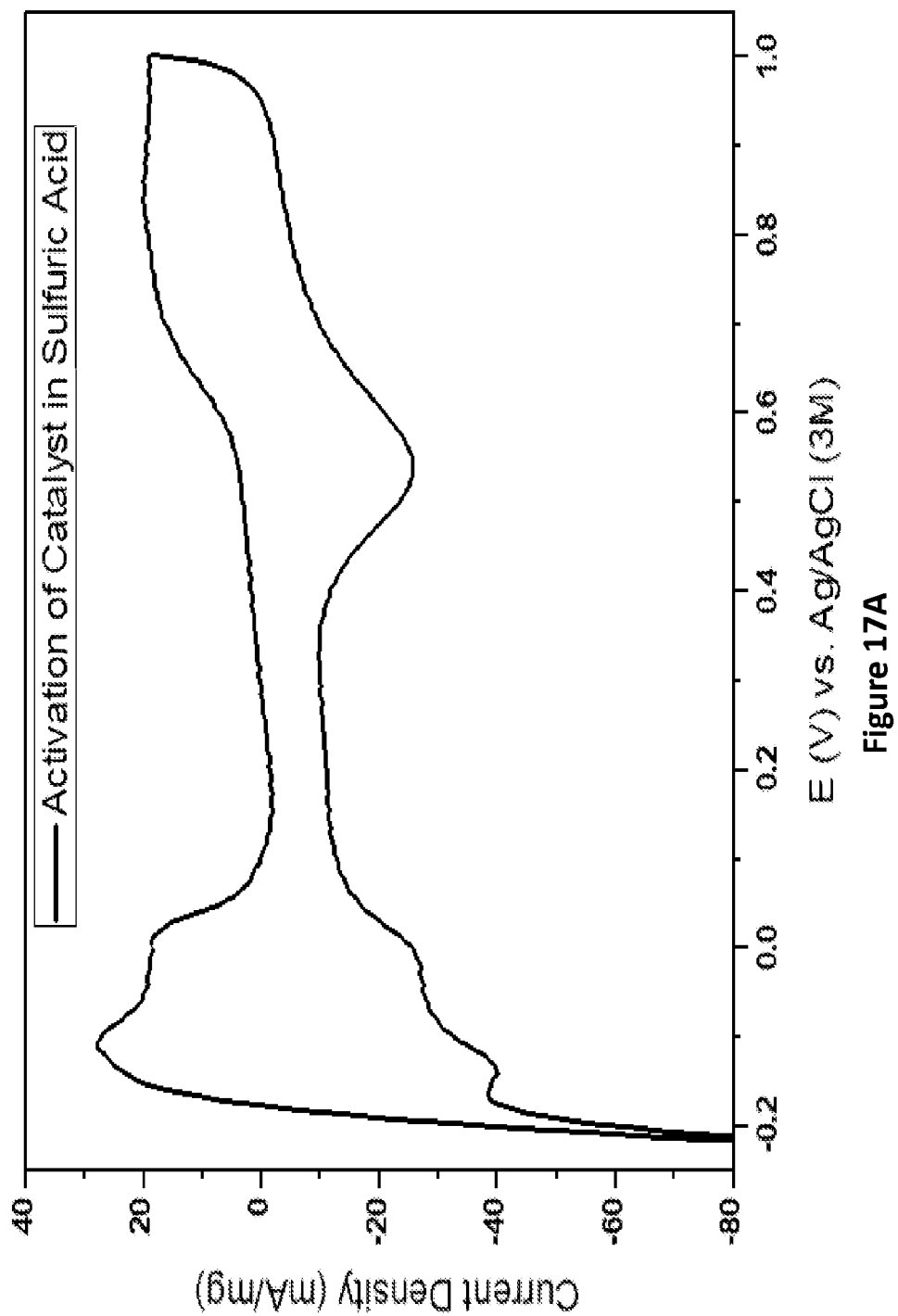
FIGS. 17A-17D present voltammograms of: $Pt_3Pd_3Sn_2/C$ in supporting electrolyte (0.5 M $H_2SO_4$) (FIG. 17A); Methyl formate, methanol and formic acid oxidation (FIG. 17B); oxidation of formic acid and methanol solution (FIG. 17C); and chronoamperometry (I vs. t) curve (FIG. 17D).

The catalysts were electrochemically activated by cycling in supporting electrolyte in potential range of −0.22-1.0 V until a stable voltammogram was obtained (FIG. 17A). The hydrogen adsorption/desorption peaks are observed in potential range of −0.20-0.10 V and peaks for formation/reduction of Pt oxide could be observed at 0.50-0.60 V. The specific electrochemical active surface areas of platinum based catalysts were calculated from desorption charge of hydrogen atoms.

The calculated ECSA for catalyst was 23.3 m$^2$g$^{-1}$. The hydrogen adsorption/desorption regions are partially suppressed because of competition for active sites between fuel and hydrogen and strong absorption of fuels on catalyst surface.

Fuel Cell Electro-Oxidation Behavior:

The anode catalyst ink was prepared by dispersing Pt$_3$Pd$_3$Sn$_2$/C and Nafion® (5% in aliphatic alcohol) in an appropriate amount of water by sonication. Similarly, cathode catalyst ink was prepared by dispersing Ru/C black (HiSPEC), Nafion® (5% in aliphatic alcohol) in an appropriate amount of water. The Nafion® content on both anode and cathode side was 20 wt % in catalyst inks. Both anode and cathode catalyst inks were spray coated directly on pretreated Nafion 212 membrane (50.8 μm) at 70° C., and dried under vacuum at 100° C. Finally, the MEA was sandwiched between graphite bipolar plates of laboratory 2×2 cm$^2$ single cell fuel cell (Electrochem).

Hydrophilic Toray carbon sheet was used as the electrode support and current collector. The loading of catalyst on anode and cathode side was 1.05±0.15 mg$_{PGM}$ cm$^{-2}$ and 1.5±0.15 mg$_{Pt}$ cm$^{-2}$ respectively. Mass spectrometry measurements were carried out using Hiden Analytical system (HPR20 Gas Analysis System) equipped with a quadrupole detector, spectrometer controlled using MASsoft software. A cross beam ion source, with nominal electron impact energy of 100 eV was used for ionization, and a Faraday cup was used for ion detection. A heated (160° C.) capillary inlet of mass spectrometer was connected to the anode outlet of fuel cell, thus, avoiding condensation of water and other products. The fuel cell was operated in a half-cell mode, in which humidified DME and hydrogen gases streamed through the anode and cathode respectively. The gaseous intermediates were analyzed in mass range of 1-60 amu. Humidified nitrogen was fed to the anode side at the flow rate of 25 ml min$^{-1}$ and 1M MF solution was supplied to the cathode side at the flow rate of 5 ml min$^{-1}$.

Only forward sweeps of voltammogram are presented for clarity of electro-oxidation behavior of each fuel (FIGS. 17A-D). The onset potential of methyl formate oxidation was 0.00 V and two oxidation peaks were observed. The peak current density of methyl formate oxidation was 260 mA mg$^{-1}$ at 0.75 V. The peak current density of formic acid was 220 mA/mg, slightly lower as compared to other two fuels. The onset potential of methanol oxidation (0.20 V) was slightly shifted in positive direction, and a large oxidation peak was observed at 0.75V. In higher potential region (<0.60V), the formation of oxide on catalyst surface starts, leading to inhibition of methanol oxidation.

The methanol oxidation current peak in the forward scan represents the capacity of electro-catalytic activity for methanol, whilst the oxidation peak in the backward scan corresponds to the removal of the residual carbonaceous species formed in the forward scan. The ratio of the forward peak current to the backward peak current can be used to evaluate the tolerance of the catalysts to the intermediate carbonaceous species accumulated on the electrode surface.

Formic acid electro-oxidation on Pt based catalyst obeys dual-path mechanism; direct and indirect. The oxidation of formic acid starts at low potential (0.0V) followed with two oxidation peaks at 0.30 V and 0.77 V. The first peak corresponds to the formic acid oxidation through direct pathway, whereas the second peak represents oxidation through indirect pathway. The peak current density of first and second peak was 80 mA mg$^{-1}$ and 220 mA mg$^{-1}$, respectively. As the low anode over potential is preferred for fuel cell operation, it is desirable to oxidize formic acid through direct pathway.

The ratio of total charge under the first and second peak represents a fraction of formic acid undergoing a direct/indirect pathway. The reverse peak represents the further oxidation of intermediates through cathode process.

The electro-oxidation of formic acid is dominant in low potential region, whereas electro-oxidation of methanol is main reaction in high potential region.

Similar to formic acid, the onset potential of methyl formate oxidation was also 0.00 V and two oxidation peaks were observed. The peak in low potential region corresponds to the oxidation of formate part, whereas the peak in high potential region corresponds to the methanolic part. In low potential region (>0.5V), most of the oxidation current originates from formic acid oxidation; that is produced by hydrolysis of methyl formate. Formic acid is preferentially oxidized at low potentials due to the fact that it is adsorbed on the catalysts faster than methanol.

In the high potential region (<0.5V), methanol produced by hydrolysis of methyl formate can join the oxidation process together with formic acid oxidation through indirect pathway. Without being bound by any particular theory, it is assumed that since the kinetics of formic acid oxidation is very fast under the high potential, the depletion of molecules on catalyst surface could allow methanol to adsorb and be oxidized in this region.

Although the onset potential and two oxidation peaks in methyl formate oxidation was similar to formic acid, the peak oxidation current was higher in case of methyl formate. Moreover, in case of methyl formate oxidation both peak potentials also shifted in positive direction (0.30V vs. 0.35V and 0.75V vs. 0.78V) as compared to formic acid.

Without being bound by any particular theory, in order to support the hypothesis of methyl formate hydrolysis to methanol and formic acid, and above mentioned oxidation behavior in low and high potential region, electro-oxidation of 0.5M methanol and 0.5M formic acid solution was performed.

Figure 17B:
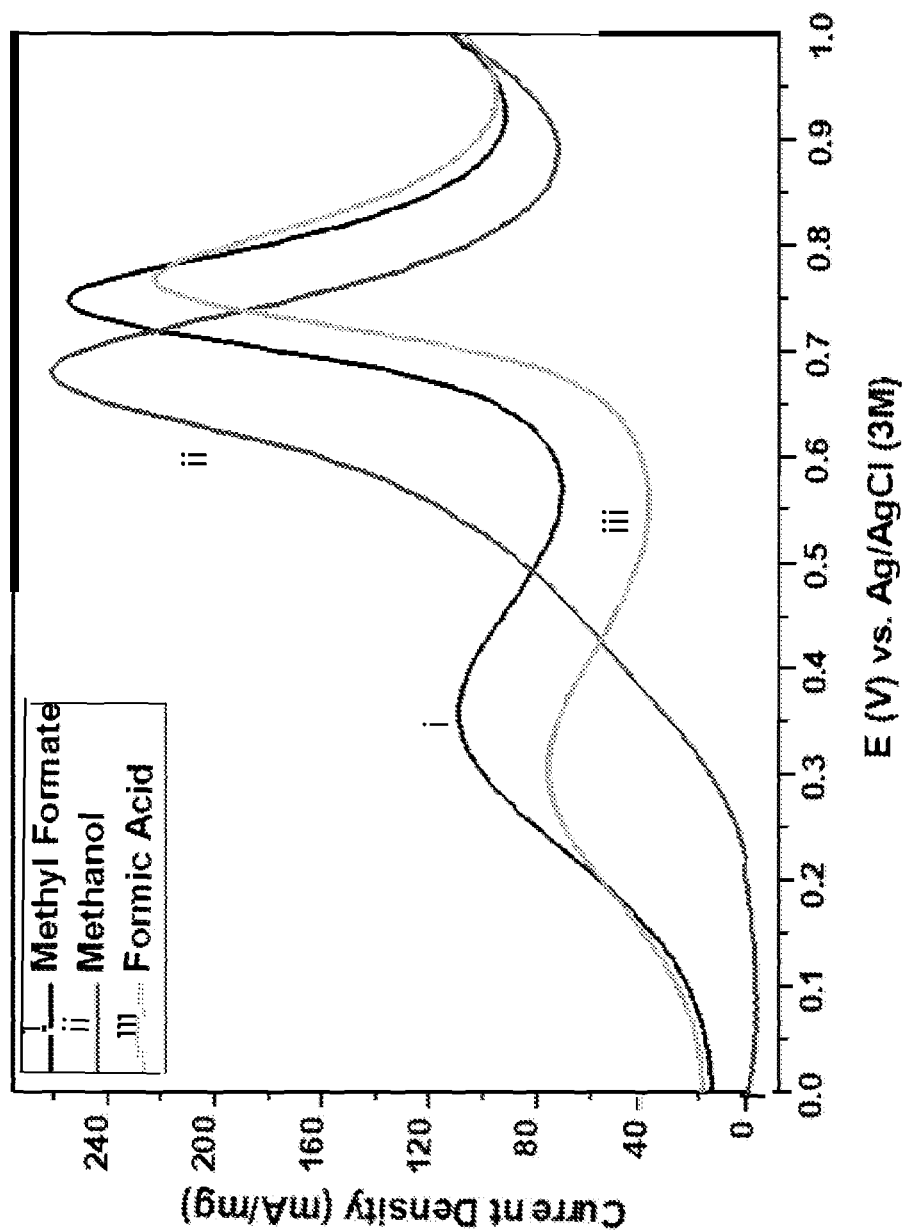
Figure 17C:
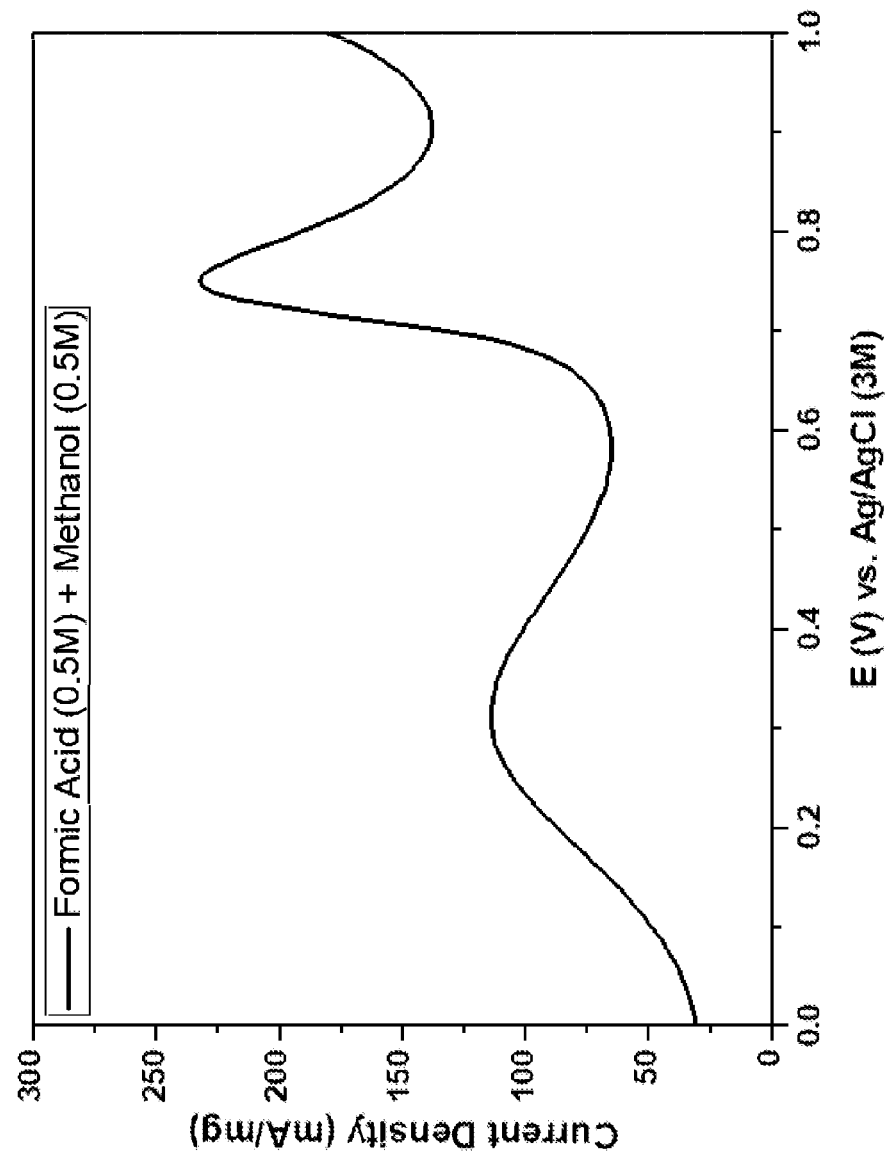
Figure 17D:
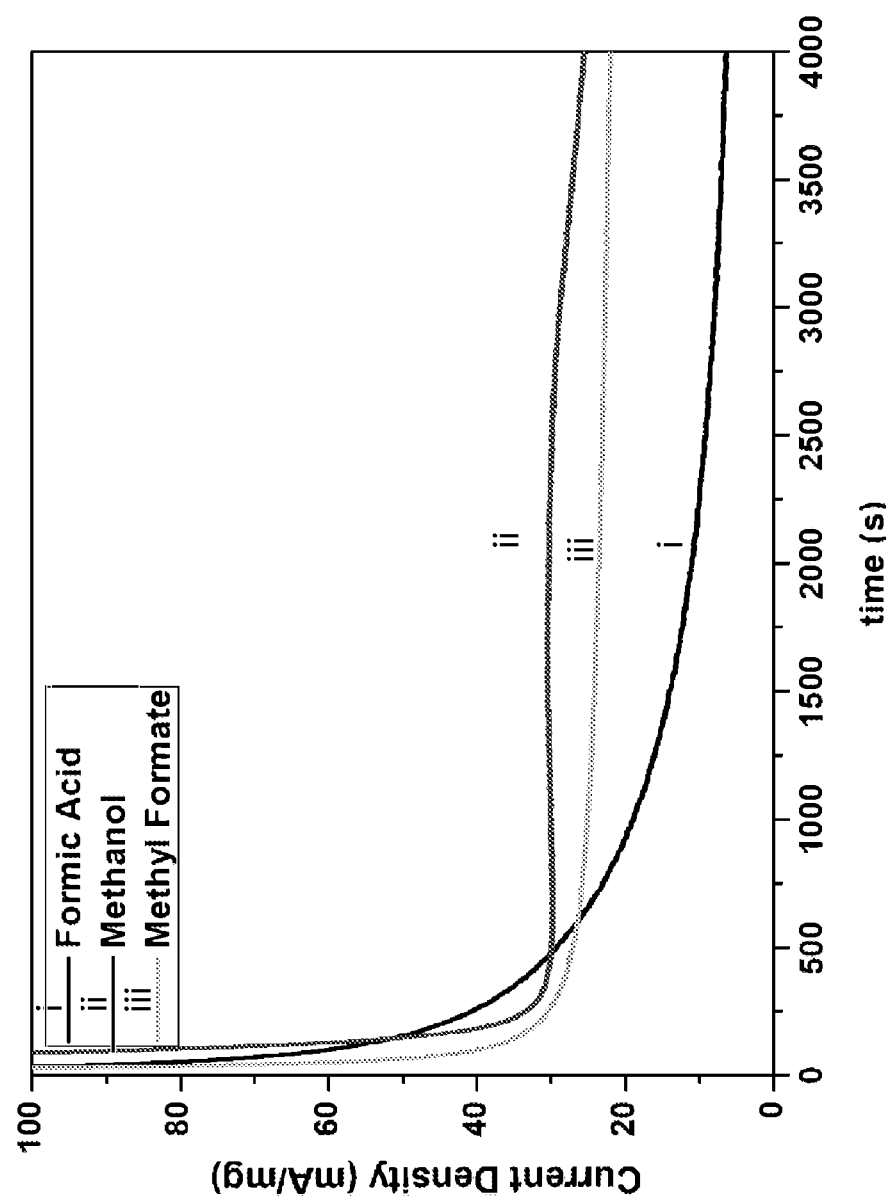

The voltammogram of methanol and formic acid solution was similar to the methyl formate oxidation. They showed not only similar shapes but also analogous current densities as shown in FIG. 17B. In low potential region, the onset potential and peak current was 0.0 V and 100 mA/mg respectively.

Similar to methanol, the peak potential shifted in negative direction by 50 mV. But the peak current was 20 mA higher than the formic acid oxidation alone. In the high potential region, the peak current was similar to the methyl formate oxidation. Hence, on the time scale of experiment, methyl formate was hydrolyzed and form formic acid preferentially oxidized in low potential, whereas methanol oxidize preferentially in high potential region. Its clear form the above discussion that the in low potential region (>0.5V) formic acid is oxidized and in high potential region (<0.5V) methanol undergoes oxidation on catalyst surface. Thus, it is clear from the above discussion that the Pt$_3$Pd$_3$S$_{n2}$/C could be a good anode catalyst for PEMFCs operated on methyl formate, formic acid and methanol. The stability of catalyst was examined by the chronoamperometry.

The surface of catalyst was cleaned by holding the electrode potential at 0.85V for 2 s, after that instantly switched back to 0.4V for 2 s that allows the methanol/methyl formate to adsorb on catalyst surface. Finally the potential was hold at 0.62V. The characteristics I vs. t curve of fuel oxidation is presented in FIG. 17D. It was observed that the steady state was achieved within 2-3 min after starting experiment. Similar to voltammetry experiments, the current density follows the order methanol>methyl formate>formic acid, remains constant at 30 mA/cm².

Figure 18:
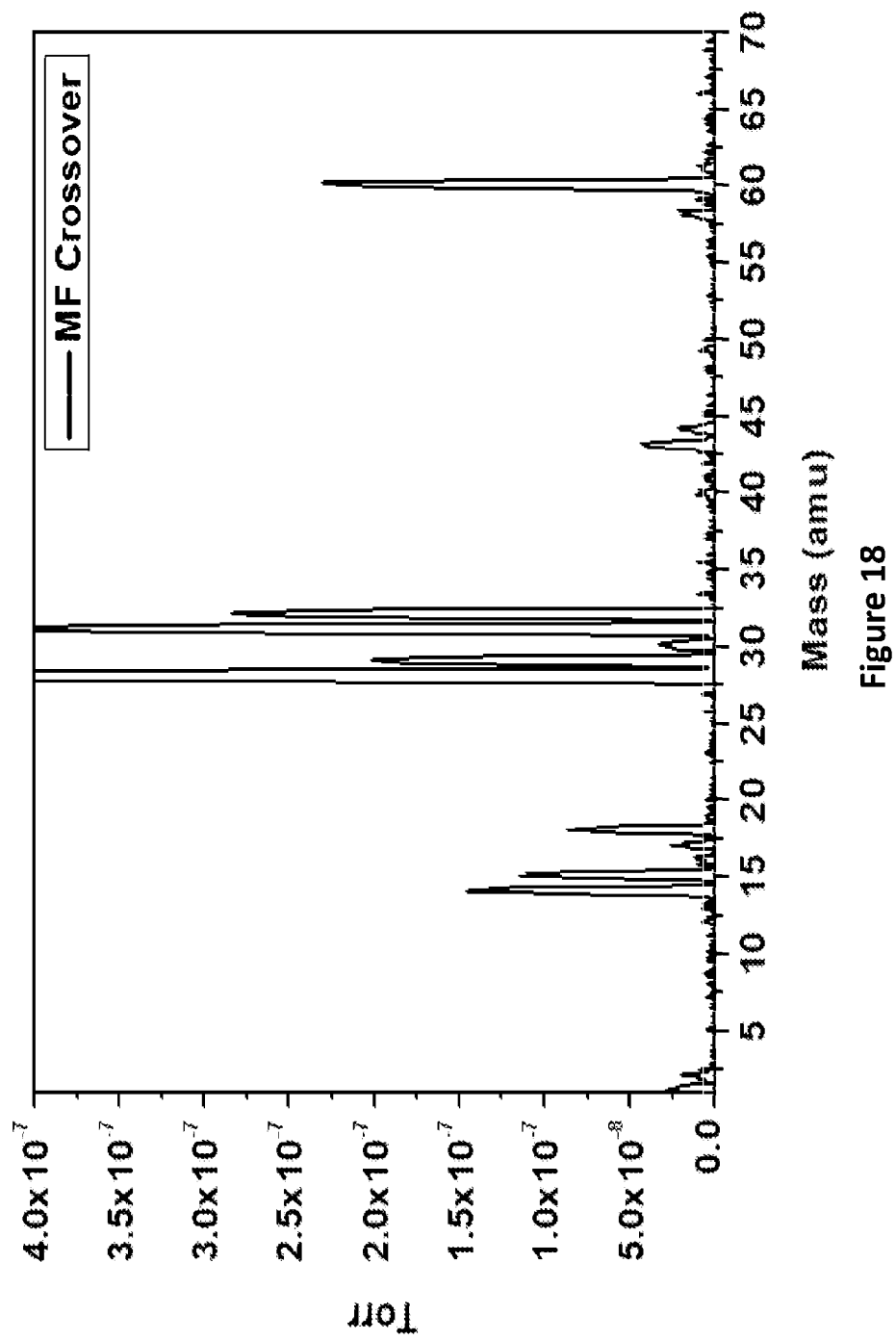
FIG. 18 presents a graph showing the mass spectrum of methyl formate crossover through Nafion 211 membrane.
Figure 19A:
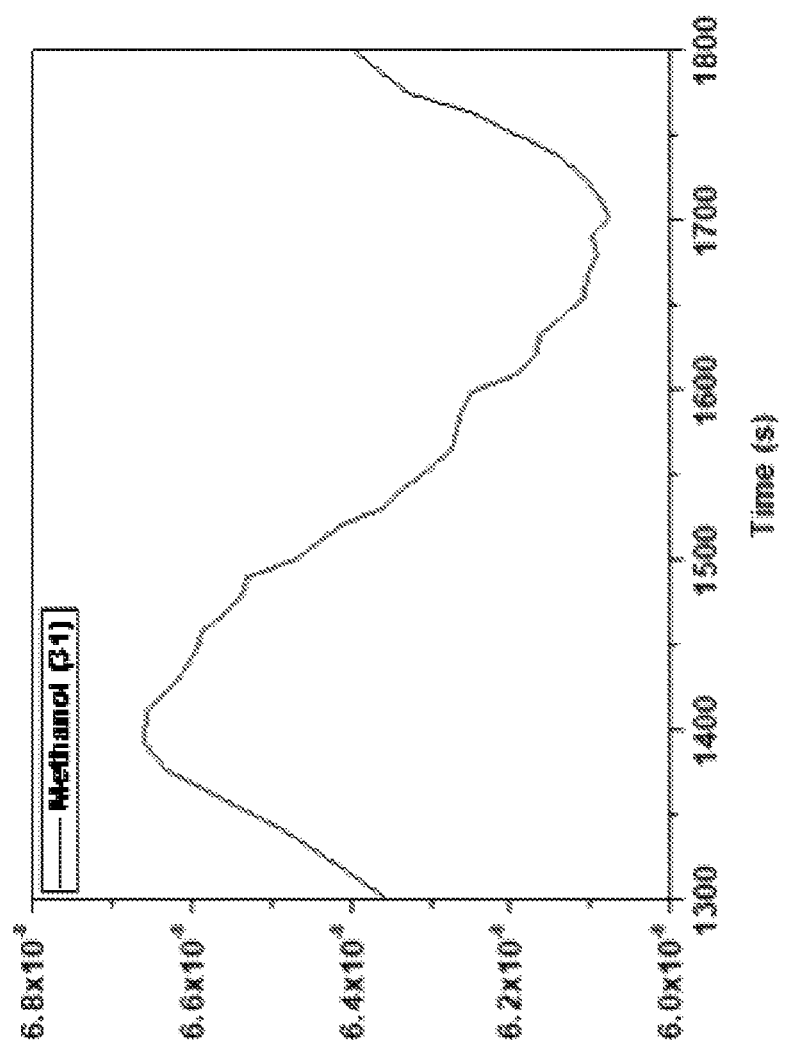
FIGS. 19A-19D present graphs showing mass signals (MS) of methanol (m/z=31) (FIG. 19A), formic acid (m/z=17) (FIG. 19B), methyl formate (MF) (m/z=60) (FIG. 19C), carbon dioxide (m/z=44) (FIG. 19D) at potential sweep 10 mV/s (cell temperature: 50° C., 1.0 M MF at the flow rate of 5 ml/min, nitrogen on cathode side at flow rate of 30 ml/min).
Figure 19B:
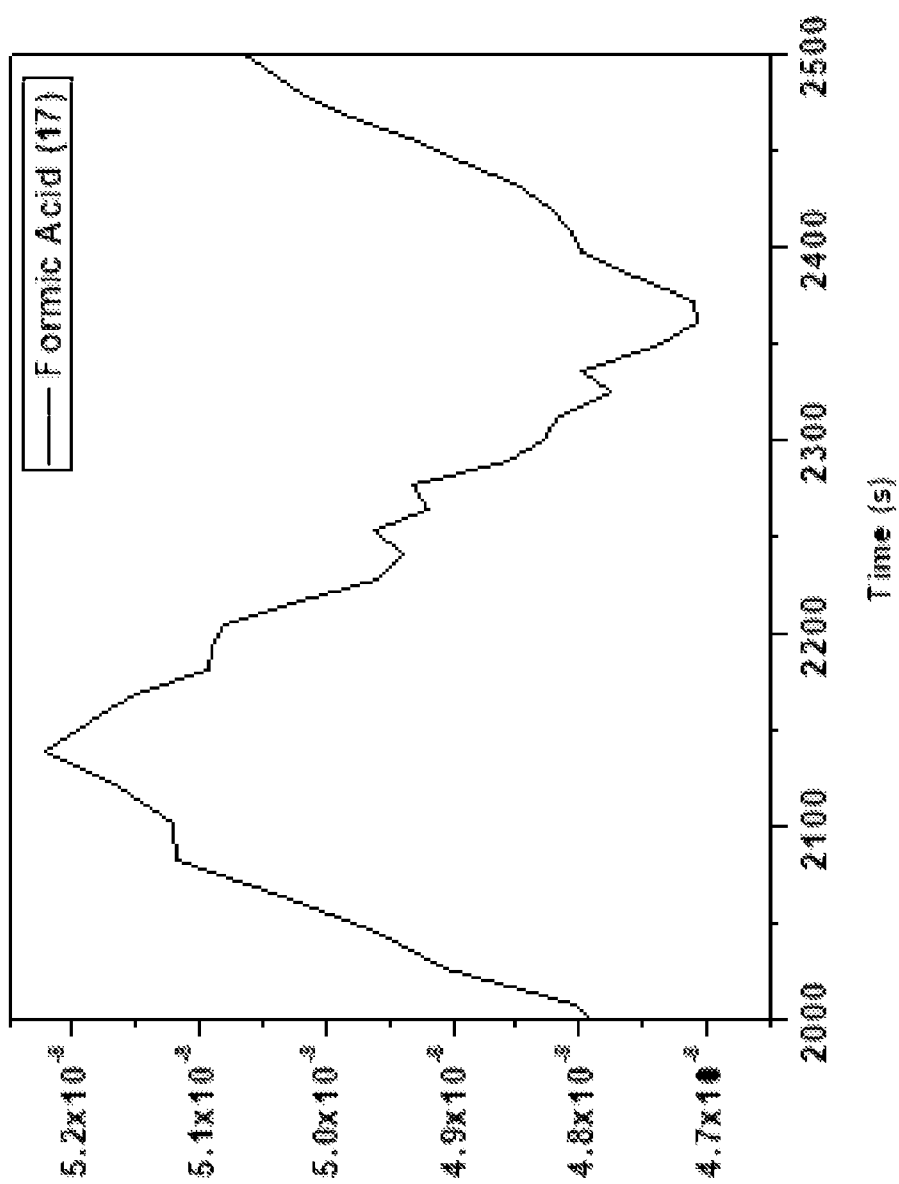
Figure 19C:
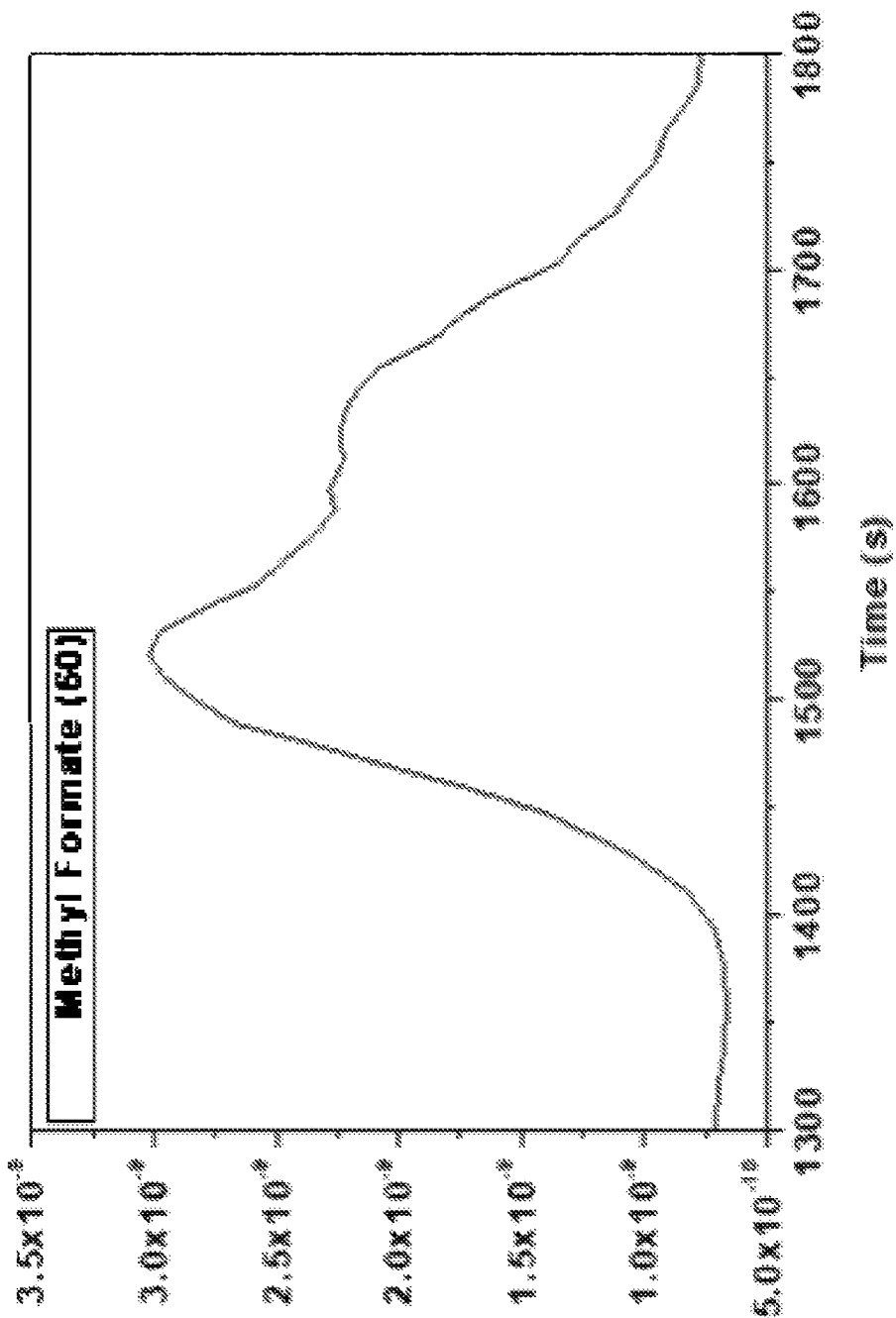
Figure 19D:
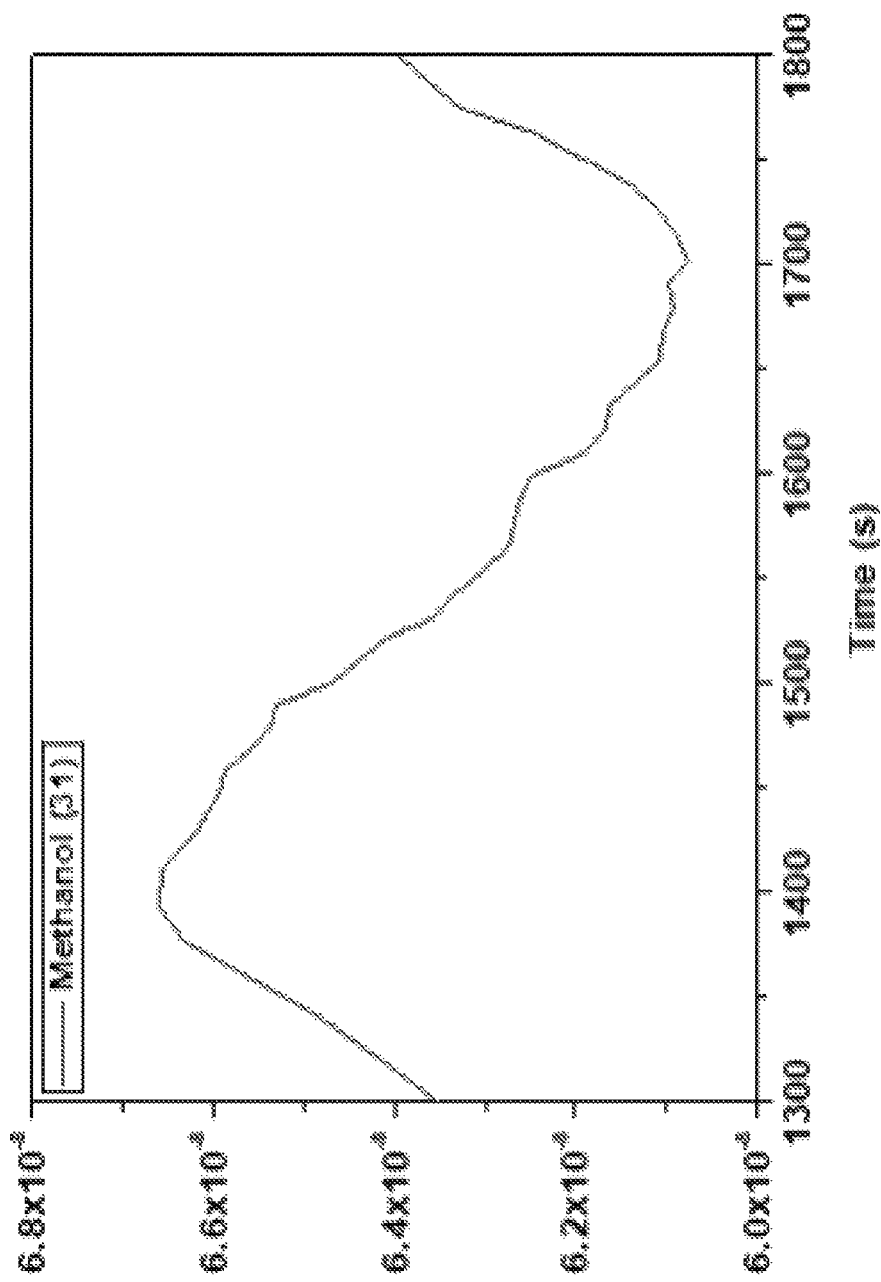

Fuel Cell Online Mass Spectroscopy:

The methyl formate crossover and hydrolysis into methanol and formic acid of a highly acidic Nafion membrane was examined by flowing 1M solution on anode side and examine the mass signal of cathode exhaust. The methyl formate mass signal (m/z=60, 31, 32, 29) is shown in FIG. 18. The mass signal of methanol and formic acid coincides with methyl formate; hence in order to distinguish methanol and formic acid mass signal from methyl formate the ratio of mass signal (m/z=60/31) intensity was analyzed (FIGS. 19A-D). In absence of any hydrolysis, the ratio of peak intensity (60/31) should be constant, whereas decrease in ratio of peak intensity shows hydrolysis. The mass spectrum confirms that a small fraction of methyl formate was hydrolyzed to methanol and formic acid. Methyl formate oxidation was studied under potential sweep and constant potential mode and change in mass signal was monitored.

Without being bound by any particular mechanism, it is assumed that the oxidation of methanol starts with the adsorption on catalyst surface followed by successive dehydrogenation steps, yielding linearly bonded $CO_{ad}$. At sufficiently high anodic potentials, the adsorbed $CO_{ads}$, reacts with adsorbed $OH_{ads}$ intermediate. These promoting effects make the oxidation of $CO_{ad}$ to $CO_2$ at low potentials easier, thus improving the CO tolerance of the anodic electrocatalyst as provided below:

$$CH_3OH+H_2O \rightarrow CO_2+6H^++6e^-$$

Figure 20A:
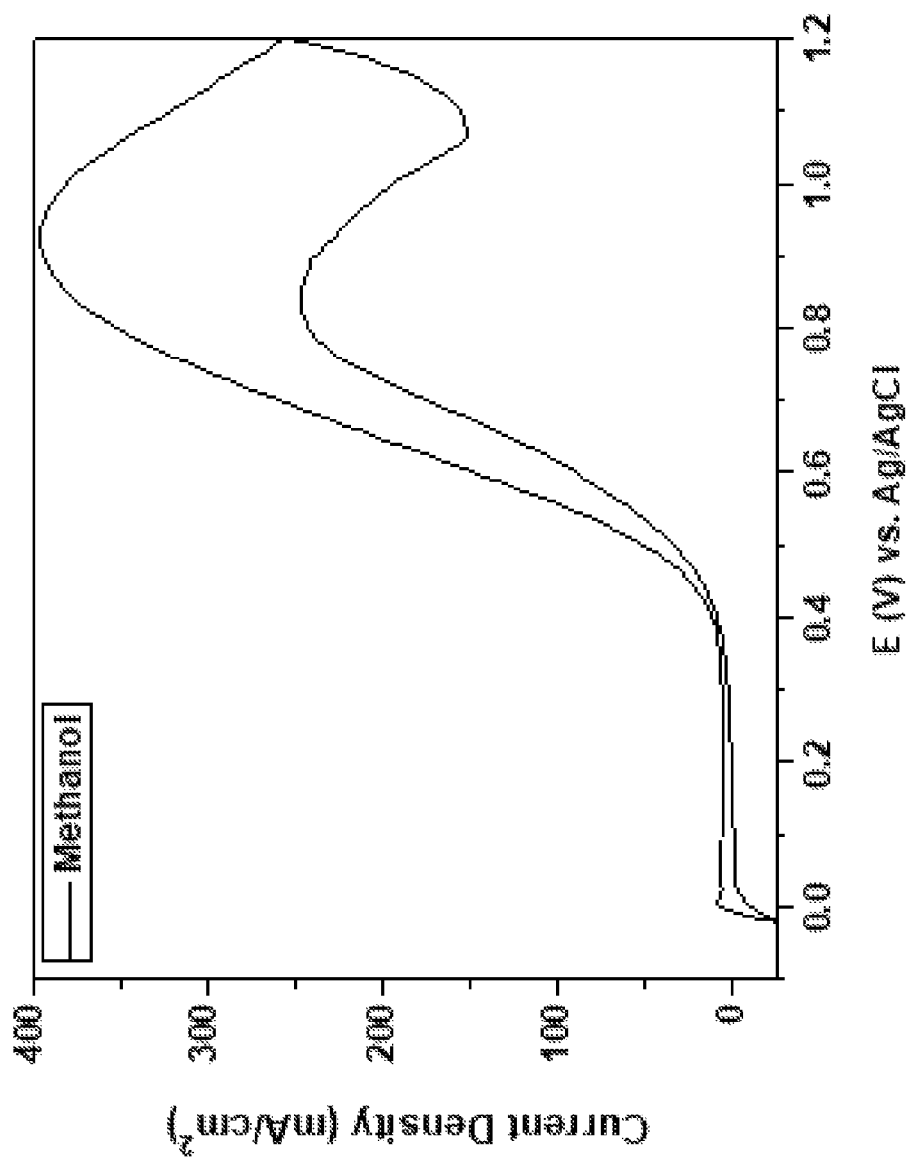
FIGS. 20A-20B present graphs showing: anode polarization of MF (FIG. 20A) and background MS at open circuit potential (without applying any potential step) (FIG. 20B).
Figure 20B:
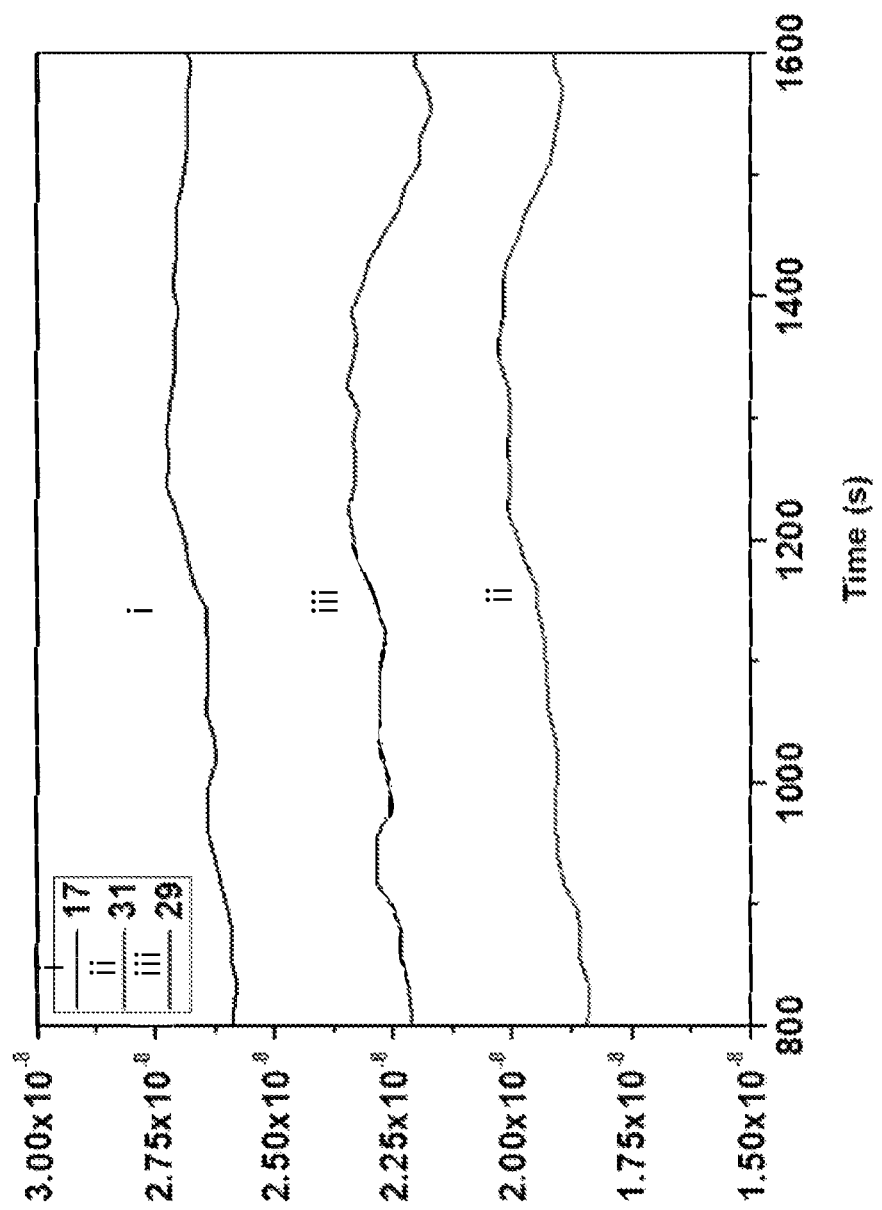

Methanol oxidation at potentials negative of 0.5 V is largely hindered by a reaction inhibiting $CO_{ad}$ which results from dehydrogenative methanol adsorption in the preceding potential scan. The faradaic current and the $CO_2$ mass spectrometric signal shows that methanol oxidation start at 0.25 V in the positive-going scan. At potentials positive of 1.0 V, methanol oxidation is suppressed by PtO formation. It is re-activated again by PtO reduction in the negative-going scan. Overall, these effects result in the well-known bell shaped polarization curves. At potentials of 0.4-0.5 V, where the Pt surface is largely blocked by adsorbed CO, the reaction is dominated by incomplete oxidation of methanol to mainly formaldehyde. With increasing potential, the current efficiency for $CO_2$ formation increases, reaching maxima at 0.8 V (FIGS. 20A-B).

The formic acid undergoes oxidation through dual pathway mechanism (direct and indirect pathway). The direct pathway bypasses the formation poisoning intermediate ($CO_{ad}$) and directly oxidized to $CO_2$, whereas the poisoning intermediate ($CO_{ad}$) is formed in indirect pathway (see equations below).

Without being bound by any particular mechanism, the pure Pd and Pt based catalysts favors the formic acid oxidation through direct and indirect pathway, respectively as provided in the oxidation equations below. However, pure palladium based catalyst lacks sustained performance from the accumulation of $CO_{ad}$ that can form from competition by the indirect pathway. Palladium has been alloyed with the other ad-atoms that promote its activity at low over-potentials and to improve its stability by limiting $CO_{ad}$ formation is essential. The addition of ad-atoms to the catalyst surface, like Bi, Sb and Sn has been shown to improve formic acid electro-oxidation activity at low over-potentials by so-called ensemble or third-body effects.

The oxidation equations are:

$$\text{Direct Pathway: } HCOOH+Me \rightarrow CO_2+2H^++Me+2e^-$$

$$\text{Indirect Pathway: } HCOOH+Me \rightarrow Me\text{-}CO_{ad}+H_2O$$

$$Me+H_2O \rightarrow Me\text{-}OH_{ad}+H^++e^-$$

$$Me\text{-}CO_{ad}+Me\text{-}OH_{ad} \rightarrow 2Me+CO_2+H^++e^-$$

(Me=Pt & Pd)

For instance, in direct methanol fuel cell (DMFC) often side production of carbon monoxide, formaldehyde, formic acid, or hydrogen peroxide is a serious issue limiting the lifetime of the membrane electrode assembly. Despite the relatively simple oxidation reaction, two-electron oxidation of formic acid leads to $CO_2$ as the only reaction product, the potential sweep results in a rather complicated faradaic and mass spectrometric current response. The faradaic current starting to increase slowly at 0.15 V and peak current observed at 0.7 V.

In the negative going sweep, after passing through two maxima at about 0.72 and 0.80 V, it then decays again. The current decay at more positive potential is attributed to increasing $OH_{ad}$ accumulation and PtO formation, where the latter is not active for formic acid oxidation in this potential regime. In the negative-going scan, the current starts to increase steeply at 0.9 V, after reduction of the PtO. The steep increase in the formic acid oxidation rate at about 0.7 V in the positive-going scan coincides with the oxidation of $CO_{ad}$, and is therefore attributed to the appearance of $CO_{ad}$-free, reactive Pt sites. In the positive-going scan, $CO_2$ formation during continuous HCOOH oxidation starts already at potentials as negative as 0.2 V.

Taken together, in exemplary procedures, the fuel flexible supported on quantum dots ($Pt_3Pd_3Sn_2/C$) was synthesized by ethylene glycol assisted thermal reduction. The ICP and EDX analysis showed the atomic composition of elements in catalyst was same as starting materials. The cubic phase of catalyst was confirmed by the X-ray diffraction patterns. This catalyst showed enhanced activity and stability for methyl formate electro-oxidation.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A composition, comprising a tin (Sn) film, wherein said Sn film is coated by a shell, wherein said shell:
    comprises palladium (Pd) and Sn, wherein the Pd:Sn molar ratio is in the range of 1:4 to 3:1, respectively; and
    is characterized by a thickness of less than 50 nm.

2. The composition of claim 1, wherein said thickness is in the range of 2 nm to 10 nm.

3. The composition of claim 1, wherein said shell further comprises a platinum (Pt).

4. The composition of claim 3, wherein said Pt and said Sn are present in the shell in a molar ratio of 2:1 to 1:1, respectively.

5. The composition of claim 1, wherein the shell is in the form of crystals having a median crystallite size in the range of 3.5 to 6 nm.

6. The composition of claim 3, characterized by an X-Ray Powder Diffraction which is devoid of peaks at positions that correspond to a pristine oxide of at least one element selected from Pt, Pd, and Sn.

7. The composition of claim 1, further comprising a substrate, wherein said Sn film:
    (a) is deposited on at least one surface of said substrate;
    (b) is coated by said shell.

8. The composition of claim 7, wherein said substrate is in the form of plurality of nanoparticles (NPs), wherein said plurality of NPs is characterized by a median size of from about 1 to about 50 nanometers.

9. The composition of claim 7, wherein said substrate is a material selected from a carbon, a metal oxide, a polymer, or any combination thereof.

10. The composition of claim 9, wherein said carbon is selected from the group consisting of activated carbon, graphite, carbon nanotube, or any combination thereof.

11. The composition of claim 1, wherein said Pd:Sn molar ratio is from 3:4 to 1:4.

12. The composition of claim 1, being an electro-catalyst.

13. The composition of claim 3, characterized by a specific activity of at least 0.05 mA cm$^{-2}$ Pt.

14. The composition of claim 12, wherein the electro-catalyst is capable of promoting a hydrogen oxidation reaction (HOR) with an onset potential of between about 0 mV in alkaline media.

15. The composition of claim 14, wherein the electro-catalyst is present in an anode of a fuel cell.

16. A method for oxidizing a material selected from the group consisting of methanol, ethanol, formic acid, formaldehyde, dimethyl ether, methyl formate, hydrogen, glucose, ammonia, and hydrazine, the method comprising contacting the composition of claim 1 with said material.

17. The method of claim 16, wherein any one of: (i) said oxidizing of said hydrogen is performed in an alkaline electrolyte solution; (ii) said alkaline electrolyte solution is characterized by a pH value of at least 11; and (iii) said alkaline electrolyte solution is a sodium hydroxide (NaOH) solution.

18. A fuel cell comprising an electro-catalyst, the electro-catalyst comprising a tin (Sn) film, wherein said Sn film is coated by a shell, wherein said shell comprises palladium (Pd) and Sn having a molar ratio in the range of 1:4 to 3:1, respectively, wherein said catalyst is capable of catalyzing a hydrogen oxidation reaction.

19. The fuel cell of claim 18, wherein any one of: (i) the fuel cell further comprises a membrane electrode assembly (MEA); (ii) the fuel cell having an anode comprising said electro-catalyst; and (iii) said catalyst is characterized by an electrochemically active surface area of at least 75 m$^2$g$^{-1}$.

20. A process for manufacturing an electro-catalyst comprising a substrate having attached thereon an Sn film, wherein:
    (a) said Sn film is coated by an alloy comprising Pd and Sn, wherein the Pd:Sn molar ratio is in the range of 1:4 to 3:1, respectively, and
    (b) said substrate comprises one or more materials selected from carbon, a metal oxide, a polymer, or any combination thereof,
    the process comprising the steps of:
        (i) electro-depositing said Sn film on said substrate; and
        (ii) depositing said alloy on said Sn film, optionally by a process selected from electro-deposition or electroless deposition;
    thereby obtaining said catalyst.

* * * * *